(12) United States Patent
Melling et al.

(10) Patent No.: US 11,840,469 B2
(45) Date of Patent: Dec. 12, 2023

(54) APPARATUS FOR PRODUCING POTABLE WATER

(71) Applicant: GM INNOVATIONS LIMITED, Glasgow (GB)

(72) Inventors: Gerard Melling, Glasgow (GB); Alan Suttie, Glasgow (GB); Brian Loudon, Glasgow (GB); John Elliot, Glasgow (GB)

(73) Assignee: GM INNOVATIONS LIMITED, Glasgow (GB)

( * ) Notice: Subject to any disclaimer, the term of this patent is extended or adjusted under 35 U.S.C. 154(b) by 528 days.

(21) Appl. No.: 17/049,226

(22) PCT Filed: Apr. 24, 2019

(86) PCT No.: PCT/EP2019/060534
§ 371 (c)(1),
(2) Date: Oct. 20, 2020

(87) PCT Pub. No.: WO2019/207006
PCT Pub. Date: Oct. 31, 2019

(65) Prior Publication Data
US 2021/0363041 A1    Nov. 25, 2021

(30) Foreign Application Priority Data
Apr. 24, 2018  (GB) .................................. 1806615

(51) Int. Cl.
*C02F 9/00* (2023.01)
*B04B 1/12* (2006.01)
(Continued)

(52) U.S. Cl.
CPC .................. *C02F 9/00* (2013.01); *B04B 1/12* (2013.01); *B04B 11/02* (2013.01); *C02F 1/008* (2013.01);
(Continued)

(58) Field of Classification Search
None
See application file for complete search history.

(56) References Cited

U.S. PATENT DOCUMENTS 927,059 A    7/1909  Kuchs
1,640,707 A  8/1927  Laughlin
(Continued)

FOREIGN PATENT DOCUMENTS

CH    655017 A5    3/1986
CN    201971698 U  9/2011
(Continued)

OTHER PUBLICATIONS

International Search Report and Written Opinion of the International Searching Authority for International Application No. PCT/EP2019/060534 dated Aug. 19, 2019.
(Continued)

*Primary Examiner* — Richard C Gurtowski
(74) *Attorney, Agent, or Firm* — Heslin Rothenberg Farley & Mesiti P.C.

(57) ABSTRACT

The invention provides an apparatus for providing potable water, which apparatus comprises a plurality of components linked in series to provide a flow path through the apparatus, wherein the plurality of components comprises:
(i) an inlet (4) for a stream of contaminated water requiring purification;
(ii) a centrifugal separator (20) for separating the contaminated water stream into a partially purified water stream and a contaminant stream;
(iii) a pre-filter pump (26);
(iv) a pre-filter pressure sensor (30);
(v) a first filter assembly (32) comprising one or more filter modules for removing particles of a predetermined size and/or removing organic contaminants from the partially purified water stream;
(Continued)

(vi) a post-filter pressure sensor (38);
(vii) a post-filter pump (40);
(viii) a second filter assembly comprising one or more reverse osmosis filters (48);
(ix) a UV steriliser unit (52); and
(x) an outlet (6) for purified potable water;
and wherein the apparatus further comprises an electronic controller (14) for controlling and monitoring the operation of the apparatus.

18 Claims, 15 Drawing Sheets

(51) Int. Cl.
*B04B 11/02* (2006.01)
*C02F 1/00* (2023.01)
*C02F 1/32* (2023.01)
*C02F 1/38* (2023.01)
*C02F 1/44* (2023.01)

(52) U.S. Cl.
CPC ............ *C02F 1/001* (2013.01); *C02F 1/32* (2013.01); *C02F 1/385* (2013.01); *C02F 1/441* (2013.01); *C02F 2201/005* (2013.01); *C02F 2209/008* (2013.01); *C02F 2209/03* (2013.01); *C02F 2209/40* (2013.01); *C02F 2303/04* (2013.01)

(56) References Cited

U.S. PATENT DOCUMENTS

| | | |
|---|---|---|
| 2,532,792 A | 12/1950 | Svensjö |
| 3,810,347 A | 5/1974 | Kartinen |
| 3,879,286 A | 4/1975 | Berriman |
| 4,411,645 A | 10/1983 | Tenthoff |
| 4,589,865 A | 5/1986 | Gullers |
| 4,898,571 A | 2/1990 | Epper et al. |
| 5,062,955 A | 11/1991 | Sciamanna |
| 5,707,519 A | 1/1998 | Miller et al. |
| 5,807,486 A | 9/1998 | Busch, Jr. |
| 5,904,840 A | 5/1999 | DiBella |
| 7,727,386 B2 | 6/2010 | DiBella et al. |
| 10,384,215 B2 | 8/2019 | Melling |
| 2003/0006188 A1 | 1/2003 | Constantine et al. |
| 2005/0139530 A1* | 6/2005 | Heiss ............... C02F 9/00 210/257.2 |
| 2006/0089247 A1 | 4/2006 | Ostkamp |
| 2009/0131236 A1 | 5/2009 | Bech et al. |
| 2013/0310242 A1 | 11/2013 | Madsen et al. |
| 2015/0166385 A1 | 6/2015 | Boerm et al. |
| 2016/0074880 A1 | 3/2016 | Thorwid et al. |
| 2016/0318041 A1 | 11/2016 | Melling |
| 2020/0230615 A1 | 7/2020 | Melling et al. |
| 2021/0039116 A1 | 2/2021 | Melling et al. |

FOREIGN PATENT DOCUMENTS

| | | |
|---|---|---|
| CN | 203990941 U | 12/2014 |
| CN | 206970376 U | 2/2018 |
| DE | 155981 C | 11/1904 |
| EP | 2868210 A1 | 5/2015 |
| ES | 2087816 A1 | 7/1996 |
| FR | 2556241 A1 | 6/1985 |
| FR | 2652762 A1 | 4/1991 |
| FR | 2681259 A1 | 3/1993 |
| GB | 1328683 | 8/1973 |
| GB | 1440592 | 6/1976 |
| GB | 1476670 A | 6/1977 |
| GB | 1526509 A | 9/1978 |
| GB | 2206508 A | 1/1989 |
| JP | S5127696 A | 3/1976 |
| JP | H0368407 A | 3/1991 |
| SU | 1726049 A1 | 4/1992 |
| WO | 97/04874 A1 | 2/1997 |
| WO | 02/056999 A1 | 7/2002 |
| WO | 03/070349 A1 | 8/2003 |
| WO | 03/074185 A1 | 9/2003 |
| WO | 2006/112820 A1 | 10/2006 |
| WO | 2007/011233 A1 | 1/2007 |
| WO | 2011/028122 A1 | 3/2011 |
| WO | 2014/009161 A2 | 1/2014 |
| WO | 2014/012962 A1 | 1/2014 |
| WO | 2015/082502 A1 | 6/2015 |
| WO | 2015/122919 A1 | 8/2015 |
| WO | 2018/154115 A2 | 8/2018 |

OTHER PUBLICATIONS

Search Report for Great Britain Application No. GB1806615.9 dated Sep. 25, 2018.

* cited by examiner

APPARATUS FOR PRODUCING POTABLE WATER

This invention relates to an apparatus for purifying water to provide a supply of potable water.

BACKGROUND OF THE INVENTION

US 2015/0166385 (Hennesy Mechanicql Swales LLC) discloses a mobile water purification apparatus in modular form which is designed to be air-lifted to a site requiring potable water. The apparatus comprises filters such as ultra-filtration and/or reverse osmosis filters and makes use of a cyclone separator to remove particulate matter.

CN 206970376 U (Chongqing) discloses a water purification system comprising a multistage cyclone separator and several filtration components including a reverse osmosis membrane filter.

CN 201971698 U (Kebin Bao) discloses a water purification system comprising a cyclone separator and several filtration components including a reverse osmosis membrane filter.

ES 2087816 (Aquambiente) discloses a water pre-treatment system that makes use of a reverse osmosis membrane. A hydrocyclone is used to remove solid waste from the water input.

U.S. Pat. No. 5,807,486 (Joseph B. Busch) discloses an apparatus and process for the treatment of hazardous waste water. The apparatus comprises a number of filtration stages, a reverse osmosis membrane and an ultraviolet sterilisation device and makes use of a cyclone separator to remove particulate matter from the waste water.

The aforementioned water purification systems make use of cyclone separators which are distinguished from centrifuges in that they contain no moving parts. However, cyclone separators do suffer from a number of disadvantages, amongst which are the heavy wear and tear of parts of the hydrocyclone due to the abrasion caused by particulate matter suspended in liquid moving at high velocities in the hydrocyclone. A further problem is the need to buffer the supply of liquid so as to create a consistent flow into the hydrocyclone. This can make it difficult to use hydrocyclones to process variable contaminants and differing flows.

WO 2015/082502 (GM Innovations Limited) discloses an apparatus for removing impurities from a fluid stream. The apparatus makes use of centrifugal separation for separating suspended materials from a fluid.

SUMMARY OF THE INVENTION

The present inventors have devised an improved apparatus for providing potable water.

Accordingly, in a first aspect, the invention provides an apparatus for providing potable water, which apparatus comprises a plurality of components linked in series to provide a flow path through the apparatus, wherein the plurality of components comprises:

an inlet for a stream of contaminated water requiring purification;

(ii) a centrifugal separator for separating the contaminated water stream into a partially purified water stream and a contaminant stream;

(iii) a pre-filter pump;

(iv) a pre-filter pressure sensor (v) a first filter assembly comprising one or more filter modules for removing particles of a predetermined size and/or removing organic contaminants from the partially purified water stream;

(vi) a post-filter pressure sensor;

(vii) a post-filter pump;

(viii) a second filter assembly comprising one or more reverse osmosis filters;

(ix) a UV steriliser unit; and (x) an outlet for purified potable water;

and wherein the apparatus further comprises an electronic controller for controlling and monitoring the operation of the apparatus. The apparatus may comprise one or more devices between the UV steriliser unit (ix) and the outlet (x) for monitoring the purity of the potable water.

The apparatus may also include one or more devices between the inlet (i) and the centrifugal separator (ii) for monitoring levels of contaminants in the contaminated water stream.

The devices for monitoring the levels of contaminants in the contaminated water stream and/or the purity of the potable water may take the form of devices for measuring any one or more of pH, total bacteria count (e.g. *E. coli*), conductivity, dissolved solids (e.g. nitrates, iron, manganese and other metals), water hardness, Langelier Saturation Index, odour, sediment levels, levels of plastics microparticles and nanoparticles, and turbidity.

The electronic controller may be provided with the capability for wireless communication to a remote device (e.g. a remote monitor and/or controller). As such, the apparatus may comprise a transmitter and receiver, or a transceiver, for sending and receiving signals. The apparatus may be provided with an (e.g. a radio antenna) to enable telecommunication to a remote device (e.g. a remote monitor and/or controller).

The components (i) to (x) may be arranged, from an upstream (inlet) end of the apparatus to a downstream (outlet) end of the apparatus, in the order (i), (ii), (iii), (iv), (v), (vi), (vii), (viii), (ix), (x).

The centrifugal separator (ii) separates the contaminated water stream into a partially purified water stream and a contaminant stream. Depending on the nature of the contaminants in the contaminated water stream, the centrifugal separator can be set up to remove contaminants that are lighter than water (e.g. oil residues) or contaminants that are denser than water (e.g. sand, grit and other particulates). A plurality of centrifugal separators arranged in series can be used, wherein one of the separators is set up to remove contaminants that are denser than water and another of the separators is set up to remove contaminants that are lighter than water.

The centrifugal separator (ii) is distinguished from the cyclone separators and hydrocyclones referred to in the introductory section of this application in that it comprises a separator unit rotatably mounted on a support. The centrifugal separator (ii) thus has moving parts whereas (other than a fan), a cyclone separator or hydrocyclone does not. Thus, the centrifugal separator (ii) is not a cyclone separator or hydrocyclone.

The centrifugal separator (ii) is also preferably other than a decanter centrifuge.

The centrifugal separator may be a separator as described in our earlier patent application WO2015/082502 (and in particular the separators illustrated in FIGS. 9 to 16 therein), or the separator as described in our earlier patent application WO 2018/154115 (with particular reference to the separators illustrated in FIGS. 1 to 14B of WO 2018/154115), the contents of each of which are incorporated herein by reference.

Thus, the centrifugal separator may comprise:

a support structure;

a separator unit rotatably mounted on the support structure;

means for rotating the separator unit on the support structure;

the separator unit having a longitudinal axis of rotation extending through a longitudinal tube disposed centrally within the separator unit; the longitudinal tube being connected or connectable to the inlet (i); the longitudinal tube having one or more openings for receiving the contaminated water stream under pressure; and one or more lateral openings for introducing the contaminated water stream into the separator unit; wherein the separator unit comprises, in addition to the longitudinal tube:

a centrifugal separation chamber for separating suspended material from the contaminated water stream;

a first collector for collecting partially purified water from which suspended contaminant material has been removed; and a second collector for collecting waste water containing the removed suspended contaminant material.

In a particular embodiment, the centrifugal separator may comprise:

a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber connected to the inlet (i), a first centrifugal separator outlet for collecting a higher density component of the contaminated water stream, and a centrifugal separator second outlet for collecting a lower density component of the contaminated stream;

the said first centrifugal separator outlet being connected to a first collector for collecting the higher density component and the second centrifugal separator outlet being connected to a second collector for collecting the lower density component;

the centrifugal separation chamber comprising a curved or inclined guide surface for guiding flow of the contaminated water stream from the inlet (i) in a radially outward direction;

wherein the centrifugal separator unit is provided with a wall member which is axially movable to provide a selected degree of occlusion of the first centrifugal separator outlet and thereby control flow of the higher density component through the first centrifugal separator outlet.

In this embodiment, a first collector is provided for collecting the higher density component of the contaminated water stream and a second collector is provided for collecting the lower density component of the contaminated water stream. One of the collectors is connected to the pre-filter pump (iii), the collector which is thus connected being selected according to the nature of the component collected by the collector. For example, if the primary contaminants in the contaminated water stream are particulates having a higher density than water, then the second collector collecting the lower density component (water) will be connected to the pre-filter pump (iii). Conversely, if the primary contaminant in the contaminated water stream is oil, which has a lower density than water, then the first collector collecting the higher density component (water) will be connected to the pre-filter pump (iii).

Where the contaminated water stream contains both particulate and oil contaminants, a pair of centrifugal separator units of the aforesaid type may be used in series, an upstream one of the pair being used remove one of the two types of contaminant and a downstream one of the pair being used to remove the other of the two types of contaminant.

In particular sub-embodiments of the immediately foregoing embodiment, the centrifugal separators may be further characterised by any one or more, in any combination, of the following features, namely that:

the guide surface is conical or frusto-conical; and/or the guide surface is positioned at a radially outward position with respect to the centrifugal separator inlet; and/or the guide surface is positioned downstream of the centrifugal separator inlet; and/or the wall member serves to increase or reduce the size of the first centrifugal separator outlet; and/or the centrifugal separator unit comprises inner and outer guide surfaces wherein the inner and outer guide surfaces define an annular channel which serves as the centrifugal separation chamber (for example wherein the wall member comprises a divider blade which divides the fluid stream into inner and outer streams, wherein the outer stream comprises the higher density components of the fluid and the inner stream comprises the lower density components of the fluid; and/or the apparatus further comprises a central shaft which passes through the centrifugal separator unit and is rotatably mounted on the support structure; and optionally:

the central shaft is tubular or part-tubular;

the centrifugal separation chamber inlet takes the form of a first set of lateral openings in a first end of the central shaft; for example wherein the lateral openings are elongate and angled;

the support structure comprises mounting units in which the central shaft is rotatably mounted and wherein the mounting units are or comprise labyrinth seals.

In one embodiment, the centrifugal separator comprises a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber having an inlet which is connected or connectable to the inlet (i) or to the stream of contaminated water requiring purification, a first outlet for collecting a higher density component of the stream, and a second outlet for collecting a lower density component of the stream;

the first outlet being connected or connectable to a first collector for collecting the higher density component and the second outlet being connected or connectable to a second collector for collecting the lower density component;

the centrifugal separation chamber comprising a curved or inclined guide surface for guiding flow of the fluid from the inlet in a radially outward direction;

wherein the centrifugal separator unit is provided with a wall member which is axially movable to provide a selected degree of occlusion of the first outlet and thereby control flow of the higher density component through the first outlet.

In the context of the application, the term "axially movable" refers to movement along or in the direction of the rotational axis.

"Radially" refers to a direction towards or away from the rotational axis. The direction can be orthogonal to the rotational axis or it can be at an angle between 0° and 90° with respect to the rotational axis. Thus, "radially outwardly" refers to a direction away from the rotational axis whereas "radially inwardly" refers to a direction towards the rotational axis.

The rotational axis can be substantially horizontal, or substantially vertical or at any desired angle between horizontal and vertical, with respect to the ground of the surface upon which the centrifugal separator is placed in use.

In some embodiments, the rotational axis is substantially horizontal (for example within ±3° of horizontal).

In other embodiments, the rotational axis is substantially vertical (for example within ±3° of vertical).

In other embodiments, the rotational axis is at an angle between horizontal and vertical.

The centrifugal separator unit comprises a centrifugal separation chamber inside which centrifugal separation of the components of the stream of contaminated water takes place. Upon entering the centrifugal separation chamber, the centrifugal effect created by the rotation of the centrifugal separator unit leads to the higher density components of the stream moving outwardly towards the periphery of the chamber to a greater extent than the lower density components thereby resulting in separation of the higher and lower density components. The higher density components pass out through the first outlet whereas the lower density components pass out through the second outlet.

It will be appreciated that the terms "higher density components" and "lower density components" are relative terms and do not imply any particular density values. For example, in a stream comprising a water/oil mixture, the water will typically be a higher density component and the oil a lower density component. By contrast, in a stream comprising water and entrained particulate materials (e.g. sand or grit), the sand or grit particles would typically be the higher density components and the water would be the lower density component.

The terms "first outlet" and "second outlet" are used herein to designate the nature of the components that pass through the outlet. There may be only one "first outlet" or there may be a plurality of "first outlets". For example, the centrifugal separation chamber may have a plurality of openings through which the higher density components may pass, each of the openings constituting a "first opening".

Similarly, there may be only one "second outlet" or there may be a plurality of "second outlets". For example, the centrifugal separation chamber may have a plurality of openings through which the lower density components may pass, each of the openings constituting a "second opening".

One of the first and second outlets will receive the partially purified water stream and the other of the first and second outlets will receive the contaminant stream. Which of the first and second outlets receives the partially purified water stream will depend on the nature of contaminants.

The centrifugal separation chamber has an inlet (the centrifugal separation chamber inlet) which is connected or connectable to a source of the stream of contaminated water requiring purification. The centrifugal separation chamber inlet may function as the inlet (i) or it may be connected to (in fluid communication with) the inlet (i). There may be only one such centrifugal separation chamber inlet, or there may be present a plurality of openings into the separation chamber, each of which constitutes a centrifugal separation chamber inlet.

The centrifugal separation chamber separates the contaminated water stream into a partially purified water stream and a contaminant stream. The extent of purification of the partially purified water stream can vary and will depend on the nature and concentrations of the impurities in the water stream. For example, when the stream of contaminated water comprises water and entrained particulate materials (e.g. sand or grit), the components passing out of the first outlet will typically comprise sand or grit together with some water whereas the components passing out through the second outlet may consist of water and dissolved materials, but substantially no sand and grit. When the contaminated water stream comprises a water/oil mixture, the components passing out through the first outlet (the partially purified water stream) may consist predominantly of water and any dissolved substances and, depending on the extent of separation, some oil, and the components passing out of the second outlet (the contaminant stream) may consist predominantly of oil but with some water and dissolved substances being present.

It will be appreciated that the extent of separation of the components of the contaminated water stream will typically depend on the geometry of the centrifugal separation chamber and speed of rotation of the centrifugal separator unit. Thus, for a stream comprising a water/oil mixture, the speed of rotation of the centrifugal separator unit may be selected so that substantially oil-free water passes out of the first outlet or substantially water-free oil passes out through the second outlet.

The centrifugal separator chamber comprises a guide surface. The guide surface extends circumferentially around the chamber and is typically coaxial with the rotational axis of the centrifugal separator. The guide surface is arranged and shaped such that it directs fluid from the centrifugal separation chamber inlet towards the outermost regions of the centrifugal separation chamber, where centrifugal forces are greatest. The guide surface is curved or inclined to guide flow of the fluid from the inlet in a radially outward direction. The curved or inclined guide surface reduces turbulence within the chamber and facilitates more laminar flow of the fluid through the chamber thereby improving the efficiency of separation of the components of the fluid.

The guide surface may be positioned radially outwardly with respect to the centrifugal separation chamber inlet; for example, the guide surface may surround the inlet. Therefore, the contaminated water stream passes inside of the guide surface (i.e. radially inwardly of the guide surface). The guide surface may thus define a radially outer boundary of the centrifugal separation chamber.

In one embodiment, the guide surface is inclined. Thus, for example the guide surface can be substantially conical or substantially frustoconical. In this embodiment, the radially outer boundary of the centrifugal separation chamber is therefore substantially conical or substantially frustoconical in shape.

Alternatively, the guide surface may be positioned downstream of the centrifugal separation chamber inlet. Therefore, the fluid passes outside of the guide surface (i.e. radially outwardly of the guide surface).

In one embodiment, the centrifugal separation chamber comprises inner and outer curved or inclined guide surfaces that are radially spaced apart so that the chamber takes the form of an annular channel between the inner and outer guide surfaces. The inner and outer guide surfaces are preferably spaced apart in a manner such that the cross-sectional area of the annular channel is substantially constant along the length of the channel. This further assists in reducing turbulence and thereby facilitates more laminar flow of the water stream through the chamber.

In one embodiment, the annular channel comprises:

(i) an upstream region which is radially outwardly inclined and is adjacent the inlet of the centrifugal separation chamber;

(ii) a centre region wherein the inner and outer guide surfaces have a substantially constant radius along the length of the centre region; and (iii) a downstream region which is a radially inwardly inclined region leading to the first and second outlets.

In this embodiment, the axially movable wall member can take the form of a divider blade located in the downstream region, the divider blade serving to divide the water stream into inner and outer streams, the outer stream comprising the higher density components being directed to the first outlet and the inner stream comprising the lower density components being directed to the second outlet.

The divider blade is axially movable within the downstream region of the annular channel. The divider blade is typically configured so that when it is moved in an upstream direction (i.e. against the direction of flow of the fluid), a leading edge of the blade moves closer to the inner guide surface thereby reducing the flow to the second outlet and increasing the flow to the first outlet. When the divider blade thus configured is moved in the reverse direction (i.e. in the same direction as the fluid stream), the leading edge of the blade moves closer to the outer guide surface thereby increasing the flow to the second outlet and reducing the flow to the first outlet. Thus, by varying the axial position of the divider blade, the relative volumes directed to the first and second outlets can be varied to enable fractions of a required density to be collected.

When the axially movable wall member takes the form of a divider blade, it is typically of conical or frustoconical form so as to fit into the downstream region of the annular channel.

The blade is preferably shaped to minimise any turbulence imparted to the stream. Accordingly, the end of the blade may take the form of a knife edge or be curved. Additionally, the blade (or at least the leading edge of the blade) may be formed of a hardened material, to minimise damage to the blade caused by particulate matter suspended within the stream.

In the foregoing embodiments, the inner and outer guide surfaces in the upstream region of the channel may converge to an extent necessary to maintain a constant cross sectional area for the channel. In a complementary manner, the inner and outer guide surfaces in the downstream region of the channel may diverge to an extent necessary to maintain a constant cross sectional area for the channel. In the centre region, the inner and outer guide surfaces are substantially parallel.

The centrifugal separator unit is rotatably mounted on the support structure so as to be rotatable about a rotational axis extending through the unit. The centrifugal separator unit may have a central shaft extending along the rotational axis, the central shaft being rotatably mounted on the support structure, and the centrifugal separation chamber surrounding the central shaft.

The central shaft may be of solid non-tubular construction or it may be of tubular or part tubular construction.

In one embodiment, the central shaft is of tubular construction and, for example, has a circular cross section.

When the central shaft is of tubular construction, it may be connected to the inlet (i) or connected or connectable to the source of contaminated water requiring purification so that at least part of the interior of the tubular shaft is in fluid communication with the source of contaminated water requiring purification. In this embodiment, the tubular shaft may have one or more lateral openings that communicate with the centrifugal separation chamber. Thus, liquid can pass into the tubular shaft and enter the centrifugal separation chamber through the lateral openings. There may, for example, be a plurality of lateral openings and typically these are spaced equidistantly around the circumference of the tubular shaft. In order to prevent liquid from passing along the entire length of the tubular shaft, the shaft may contain a blocking element. The blocking element may be in close proximity to the lateral openings in order to facilitate flow of the liquid into the centrifugal separation chamber and minimise turbulence. The lateral openings are typically elongate and are angled with respect to the rotational axis of the tube. The use of elongate and angled openings is advantageous over the use of circular openings, as they reduce or prevent clogging of the holes and improve liquid flow into the centrifugal separation chamber (i.e. they impart less turbulence to the liquid).

In one embodiment, the centrifugal separation chamber is defined by a frustoconical radially outer wall that surrounds the rotational axis and flares outwardly in a downstream direction and optionally extends into a substantially cylindrical portion, and a downstream end wall comprising the axially movable wall member. In this embodiment, the first outlet is located in the substantially cylindrical portion, where present, or at or adjacent a wide point of the frustoconical radially outer wall. Movement of the axially movable wall member backwards or forwards along the rotational axis serves to increase or reduce the size of the first outlet and thereby control flow of the higher density component through the first outlet. In this embodiment, the centrifugal separation chamber may surround a central tubular shaft, the tubular shaft having a blocking member in the bore thereof to prevent passage of liquid along the entire length of the shaft and having one or more (typically a plurality) of lateral inlet openings through which the stream of contaminated water can enter the centrifugal separation chamber. The axially movable wall member may be provided with one or more openings radially inwardly of the outer edge thereof (e.g. adjacent a radially inner edge thereof) that constitute one or more second outlets through which lower density components of the contaminated water stream can pass. Alternatively, or additionally, the central tubular shaft may have a second set (of one or more) lateral openings, upstream of the movable wall member, that serve as a second outlet through which the lower density components of the stream of contaminated water can pass, a blocking member being disposed within the tubular shaft between the lateral inlet openings and the second set of openings. Thus, liquid entering the centrifugal separation chamber is subjected to centrifugal forces such that higher density components of the liquid move to the outer region of the chamber and pass out though the first outlets whereas lower density components of the liquid pass through the openings in the axially movable wall member and/or the second set of lateral openings.

The second set of lateral openings can take the form of slots, e.g. elongate slots, within one or more of which a mounting strut is provided for linking the axially movable wall member to an actuating rod disposed within the interior of the central tubular shaft, the actuating rod being movable backwards and forwards along the rotational axis to move the mounting struts along the slot and hence move the said wall member. For example, there may be three or four slots each of which accommodates a mounting strut.

Where the axially movable wall has openings radially inwardly of the outer edge thereof through which lower density components of the stream of contaminated water can pass, the tubular shaft may be provided with a third set of (one or more) lateral openings positioned downstream of the moveable wall so that lower density liquid passing through the openings in the axially movable wall can then pass into the interior of the tubular shaft and thereafter on to a collector.

The separator unit is arranged about (i.e. encircles) the rotational axis of rotation. The separator unit may comprise an at least partially hollow shell which contains the components of the separator unit described herein. The separator unit may therefore comprise a hollow or partially hollow central portion and two end portions. In one embodiment, the separator unit comprises a cylindrical central portion and two frustoconical end portions.

In another embodiment, the separator unit has a cylindrical exterior. The inside of the cylinder may additionally be shaped to define the centrifugal separation chamber. For example, part of the interior of the cylinder may have an inclined or curved surface, which may act as the guide surface.

The centrifugal separation chamber may be made from metals, plastics or other durable materials or combinations thereof. In one embodiment, the centrifugal separation chamber is made from stainless steel. The inner surfaces of the centrifugal separator unit which are exposed to the stream of contaminated water are preferably polished to minimise turbulence and promote more laminar flow of the liquid through the centrifugal separator.

In each end wall of the centrifugal separator unit, there may also be one or more openings which serve as or are in fluid communication with the inlet of the centrifugal separation chamber. There may also be openings which serve as or are in fluid communication with one or both of the first and second outlets.

The support structure may comprise mounting units in which the central shaft is rotatably mounted. When the central shaft is tubular or part-tubular, the mounting units may also be connected or connectable to fluid inlet and/or fluid outlet pipes to introduce or remove fluid from the ends of the central shaft. In one embodiment, the mounting units comprise bearing assemblies within which the ends of the central shaft may rotate. The bearing assemblies can be of conventional construction: thus for example they can comprise bearing elements such as roller or needle bearings or an array of ball bearings, which allow rotation of the central shaft through the non-rotating support structure. The mounting units and bearing assemblies may be constructed so as to form labyrinth seals that prevent leakage or fluid from the centrifugal separator.

The mounting units may have a central opening for receiving an end of a fluid feed pipe and an annular recess radially outwardly of the central opening for receiving an end of a tubular central shaft, the annular recess typically being at least partially lined with bearing elements (e.g. as defined above) so as to facilitate rotation of the end of the central tubular shaft therein. The bearings in the mounting unit allow rotation of the tubular central shaft, whilst the mounting unit itself and the fluid feed pipe are typically non-rotating. The clearance between end of the tubular central shaft and the bearings within the annular recess is such as to allow the tubular shaft to rotate freely whilst preventing liquid from the fluid feed pipe and interior of the tubular central shaft from leaking out between the end of the shaft and the bearings. Thus the end of the shaft and the boundaries (e.g. as defined by walls or bearings) together define a narrow labyrinthine path from the interior of the tubular central shaft to the exterior of the centrifugal separator along which liquid would need to pass in order to leak to the exterior. The configuration of the labyrinthine path is such that that a labyrinth seal is created which prevents the leakage of liquid to the exterior. In order to provide further security against leakage, one or more air inlets may be for drawing or pumping air into the labyrinthine path. When air is pumped into the air inlets or drawn into the air inlets, the end of the central tubular shaft outlet is suspended within the annular recess, such that the bearings do not need to support its full weight. This allows rotation of the central tubular shaft outlet with less friction. In addition, pressure of air entering the labyrinth seal through the air inlets further prevents liquid from leaking out of the labyrinth seal. The labyrinth seal can of course be reversed so that the fluid inlet and fluid outlets are connected in the opposite manner.

The separator is provided with first and second outlets through which separated components of the contaminated water stream can pass. Thus, a first component of the contaminated water stream, or a mixture predominantly comprising a first component of the contaminated water stream can pass out through one outlet and a second component of the contaminated water stream, or a mixture predominantly comprising a second component of the contaminated water stream can pass out through the other outlet. In one embodiment, the first outlet takes the form of one or more openings on a radially outer surface of the separator unit (e.g. one or more openings in the hollow, cylindrical portion). The outlets may have walls that are at an angle of 30-45° with respect to the rotational axis in order to reduce turbulence and hence improve separation efficiency as the separated higher density components pass out through the outlet.

The second outlet may take the form of an end of the tubular central shaft, where present. Alternatively, the first outlet may encircle the second outlet, with a dividing wall (e.g. a cylindrical dividing wall) separating the two outlets.

Each of the first and second outlets are connected or connectable to the first and second collectors respectively. In one embodiment, the centrifugal separator comprises a first collector which is connected to the first outlet. In another embodiment, the centrifugal separator comprises a second collector which is connected to the second outlet. In a further embodiment, the centrifugal separator comprises first and second collectors which are connected to the first and second outlets respectively.

The or each collector is typically static, i.e. it is non-rotatably attached to the support structure and does not rotate with the separator.

A first collector associated with the first outlet may comprise a circumferential channel-shaped manifold surrounding the centrifugal separator unit with an open side of the channel facing radially inwardly towards the separator unit so as to receive separated fluid components emerging from each first outlet. The channel shaped manifold is provided with one or more openings with associated conduits through which separated liquid components may be directed to the next downstream component of the apparatus or to waste.

As the channel-shaped manifold is fixed while the centrifugal separator unit rotates, there is a small gap between the edges of the channel and an outer surface of the separator to allow rotation to take place. A moving seal may be provided between the channel shaped manifold and the separator unit to prevent escape of separated fluid components through the gap. Alternatively, the seal may take the form of a fan or labyrinth seal.

Preferably, the separator is constructed to provide a pressure differential between the interior of the manifold and the exterior so that air passes into the manifold and the passage of separated components of the contaminated water stream out through the gap is prevented.

The separator can be constructed so that the pressure differential is created by drawing air through the gap into the manifold. Alternatively, the separator can be constructed so that air (or another gas or mixture of gases) is introduced under pressure through the gap into the manifold.

In one embodiment, the outer surface of the separator unit is provided with an array of vanes around its circumference and disposed within the channel that are arranged so that air is drawn into the channel through the gap as the separator unit rotates. The vanes thus form a fan seal which prevents leakage of materials through the gap between the collector device and separator unit. The fan seal may have a variable diameter to enable the gap between the separator unit and seal to be adjusted when required or necessary.

When the centrifugal separator unit has an array of vanes around its circumference, a plurality of openings constituting the first outlets may be provided between adjacent vanes or groups of vanes. For example, each pair of vanes may have disposed between them an opening constituting a first outlet. Alternatively, openings constituting first outlets may be located every two, three or four vanes around the circumference of the separator unit.

In one particular embodiment, one or both of the collectors are disposed radially outwardly of the separator and are associated with the centrifugal separation chamber.

The centrifugal separator is provided with a drive element for rotating the separator unit. The drive element may comprise a motor (e.g. an electric motor) or a turbine (e.g. a high-pressure air turbine or a hydraulic turbine) and an appropriate mechanical linkage between the motor or turbine and the separator unit. The mechanical linkage can be, for example, a drive belt. The use of an air turbine or hydraulic turbine is advantageous in environments where it is important to avoid the hazards of electrical spark ignition of explosive gas mixtures (e.g. on oil platforms and similar locations).

The inlet (i) or the centrifugal separator inlet are preferably connected or connectable to a source of pressurised fluid requiring separation. When the contaminated water stream is pressurised, instead of, or in addition to, a motor or turbine, the contaminated water stream itself can be used to drive or assist rotation of the separator. For example, the separator may be provided with an array of vanes or nozzles and means for directing the stream or a liquid output from the separator over the vanes or through the nozzles to form a turbine which drives rotation of the separator.

In one embodiment, a liquid output from which suspended matter has been removed by the separator is used to power the turbine.

The vanes may be disposed within a collector device so that purified or partially purified water passing through the collector is used to power the turbine.

In an alternative embodiment, the flow of liquid through the separator can be split so that a proportion is used to power the turbine and the remainder is collected by a collector.

The flow of liquid into and through the centrifugal separator is typically controlled by a pump. It has been found that by using a pump that is capable of providing a substantially constant flow rate of contaminated water into the centrifugal separator, the separation efficiency of the centrifugal separator is greatly enhanced. One such pump is a wobble pump.

All surfaces of the centrifugal separator that are exposed to the contaminated water stream (including the separator unit, the inner wall, the diverter and the wall member) are preferably made from a smooth and corrosion resistant material, one example of which is stainless steel. Additionally, the surfaces may be polished to minimise turbulence and promote more laminar flow of the stream through the centrifugal separator.

The centrifugal separator described herein is typically configured to enable it to carry out a particular type of separation.

For example, the separator can be configured to separate oil and water in an oil-water mixture.

The first collector may be arranged to collect partially purified water from the centrifugal separation chamber, via the first outlet. In this embodiment, vanes may be arranged within the collector so as to form a turbine powered by the partially purified water.

The centrifugal separator may also comprise a device for determining the extent of separation (purification). Once the extent of separation of the centrifugal separator has been determined, the centrifugal separator can then be adjusted accordingly to increase the extent of separation.

In one embodiment, the device for determining the extent of separation comprises one or more light sources and one or more light detectors. The partially purified water and/or materials are then passed between one of the light sources and one of the light detectors. The purity of the water can then be determined by comparing the absorbance of the separated components from the first and second outlets, with known absorbance values for pure samples or defined mixtures of the separated components.

In another embodiment, the centrifugal separator comprises a support structure and a centrifugal separator unit rotatably mounted on the support structure so as to be rotatable about a rotational axis extending through the centrifugal separator unit;
  a drive element for driving rotation of the centrifugal separator unit;
  the centrifugal separator unit comprising a hollow body mounted on a central shaft which is rotatable about the rotational axis;
  wherein the hollow body comprises a pair of radially spaced apart walls bounding an annular centrifugal separation chamber therebetween; the annular centrifugal separation chamber having an upstream frustoconical region, a downstream frustoconical region and a substantially cylindrical middle region between the upstream and downstream frustoconical regions;
  an inlet which is connected or connectable to the inlet (i) or to a stream of contaminated water requiring purification and through which the stream of contaminated water can be introduced into the upstream frustoconical region;
  an axially movable divider blade disposed in the downstream frustoconical region, the divider blade being configured to divide the stream into a radially outer stream containing a higher density component of the fluid stream, and a radially inner stream containing a lower density component of the fluid stream;

a first collector to which the radially outer stream is directed; and a second collector to which the radially inner stream is directed.

The support structure, drive element, divider blade, and first and second collectors may be as defined above for the first aspect of the invention.

Preferably the radially spaced apart walls are spaced apart in a manner such that the cross-sectional area of the annular centrifugal separation chamber is substantially constant along its length of the channel. This further assists in reducing turbulence and thereby facilitates more laminar flow of the stream through the chamber.

In a further embodiment, the centrifugal separator comprising a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber having an inlet (the centrifugal separation chamber inlet) which is connected to inlet (i) or is connected or connectable to the stream of contaminated water requiring purification, a first outlet for collecting a higher density component of the stream, and a second outlet for collecting a lower density component of the stream;

the first outlet being connected or connectable to a first collector for collecting the higher density component and the second outlet being connected or connectable to a second collector for collecting the lower density component;

the centrifugal separation chamber optionally comprising a curved or inclined guide surface for guiding flow of the stream of contaminated water from the inlet in a radially outward direction;

and the centrifugal separator unit optionally being provided with a wall member which is axially movable to provide a selected degree of occlusion of the first outlet and thereby control flow of the higher density component through the first outlet;

wherein the first and/or the second outlets are in fluid communication with one or more devices for determining the extent of separation of the components of the contaminated water stream.

The device for determining the extent of separation may comprise one or more light sources and one or more light detectors as defined above.

The centrifugal separator is set up to separate a stream of contaminated water into a partially purified water stream and a contaminant stream. The water can be, for example, water taken from a bore hole, well, river, stream, pond, lake or body of salt water, or from a waste water container, and can be supplied to the apparatus of the invention under pressure. For example, the pressure can be supplied by means of a pump which is used to pump the water to and through the centrifugal separator. In this embodiment, the water pressure created by the pump may be used to provide a primary or ancillary means of power for rotating the separation unit. Where the water pressure is used as the primary means of power for rotating the separation unit, a motor or turbine may be used as an ancillary power source to increase the speed of rotation where the water pressure alone is insufficient to rotate the separation unit at the desired speed. A motor may also be used to initiate rotation of the separation unit in order to create an initial centrifugal force to separate out particulate matter. Once the centrifugal force has reached a level sufficient, the motor may then be turned off. Alternatively, a mechanical drive, for example provided by a motor, may constitute the sole or main means of rotating the separation unit.

The pump and any ancillary motors may be powered by mains electricity, or by means of a portable generator, or by any of a range of renewable energy sources such as solar power.

The centrifugal separator can be constructed so as to be portable, for example on a truck or lorry, and can therefore be transported quickly and easily to locations where it is needed, for example in disaster relief operations where there is a shortage or absence of clean water.

The centrifugal separator as described above provides excellent separation of contaminants from contaminated water. However, after passage through the centrifugal separator, the resulting partially purified water may retain very low levels of impurities. For example, when the stream comprises water and entrained particulate materials (e.g. sand or grit), the components passing out of the second outlet may comprise small amounts of sand or grit together with the water (and vice versa). When the contaminated stream comprises a water/oil mixture, the components passing out through the first outlet may consist predominantly of water and any dissolved substances and, depending on the extent of separation, some oil (and vice versa).

Such low levels of contaminants may impart slight turbidity to the water but are typically not visible or are difficult to see using the naked eye.

In order to reduce further (or eliminate) the levels of residual contaminants in the partially purified water stream, the first or second outlets of the centrifugal separator may be connected to a further separation device.

The further separation device may be a vortex separation device. The vortex separation device comprises a vortex-creating device which imparts a vortex to the fluid stream and a separator unit in which separation of the vortexed fluid stream occurs. At the downstream end of the separator unit, there may be two concentric outlets; an annular, radially outer outlet for collecting a denser component of the partially purified water stream and a radially inner outlet for collecting a less dense component of the partially purified water stream.

In contrast to the centrifugal separator described herein where the centrifugal separator unit (in which separation occurs) rotates to provide the centrifugal force necessary for separation, in a vortex separation device the separator unit does not rotate. Instead, as the liquid to be separated enters the separator unit, the liquid is rotated/spun to form a vortex. In this case, the rotational movement of the liquid in a vortex creates the centrifugal forces required for separation.

The vortex separation device therefore comprises a vortex-creating device for imparting a vortex to the partially purified water stream. The term 'vortex', as used herein, refers to the rotation or revolution of a liquid around an axis (typically a linear axis). The vortex-creating device may therefore be any device that is able to impart such rotation or revolution to the liquid stream.

The vortex-creating device may comprise one or more vortex-creating elements for example, spiral/screw-shaped nozzles, angled nozzles, angled vanes or angled channels. As the liquid stream passes through the vortex-creating device the vortex-creating elements direct the liquid along a circular or spiral path to impart a vortex to the fluid stream.

The vortex-creating elements are typically arranged (preferably equidistantly arranged) about a central axis around which the liquid is to be rotated. The vortex-creating elements typically comprise one or more openings or one or more baffles that are angled relative to the central axis such that a vortex is induced in the liquid as it passes through the openings or past the baffles.

The vortex-creating device is typically the only path through which the partially purified water stream can enter the separation unit. Therefore, the flow of all liquid entering the separation unit passes through the vortex-creating device and is hence affected/modified by the vortex-creating elements.

Examples of vortex-creating devices having baffles as vortex-creating elements include deflector plates, spiral/screw-shaped nozzles and angled vanes. The baffles may be angled relative to the central axis such that a vortex is induced in the fluid as it passes through the nozzles. For example, the baffles may be angled by 40° to 50°, for example 45°, relative to the central axis.

In the case of spiral/screw-shaped nozzles, the nozzles typically comprise a conical funnel having an opening at its apex. Fluid flows through the conical funnel and out through the apex. Downstream of the apex but fixed to the outer surface of the nozzle is a spiral/screw-shaped baffle defining a spiral/screw-shaped path. Therefore, liquid exiting the nozzle apex opening encounters the spiral/screw-shaped baffle and is forced along the spiral/screw-shaped path, which imparts rotation to the liquid stream.

Examples of vortex-creating devices having angled openings include angled nozzles or plates with angled channels.

When the vortex-creating elements are angled nozzles, the nozzles are arranged (preferably equidistantly) about a central axis around which the liquid is to be rotated. The nozzles are angled relative to the central axis such that a vortex is induced in the liquid as it passes through the nozzles. For example, the nozzles may be angled by 40°-50°, for example 45°, relative to the central axis.

When the vortex-creating element is a plate with angled channels, the channels are typically arranged equidistantly about a central axis around which the liquid is to be rotated. The plate is typically cylindrical in shape, with the channels passing through the full thickness of the plate. The channels are angled relative to the central axis such that a vortex is induced in the liquid as it passes through the nozzles. For example, the channels may be angled by 40° to 50°, for example 45°, relative to the central axis. The channels may be the only path through which the liquid stream can enter and exit the vortex-creating device and therefore may be the only path through with the liquid stream can enter the separator unit.

The vortex separation device may also comprise, in addition to the vortex-creating device, an impeller. The impeller serves to increase the rotational velocity of the fluid in the separator unit to enhance separation. This is particularly desirable if the components in the partially purified water stream have similar densities (e.g. water/oil). In this case, the use of an impeller increases the rotational velocity of the stream and thereby increases the centrifugal forces acting on the components of the stream to increase separation efficiency.

Alternatively or in addition, the impeller itself may be constructed so as to introduce a vortex to the stream. In this embodiment, the impeller acts as the vortex-creating device.

The impeller is typically connected to a drive element for rotating the impeller. The drive element may comprise a motor (e.g. an electric motor) or a turbine (e.g. a high-pressure air turbine or a hydraulic turbine) and an appropriate mechanical linkage between the motor or turbine and the separator unit. The mechanical linkage can be, for example, a drive belt. The use of an air turbine or hydraulic turbine is advantageous in environments where it is important to avoid the hazards of electrical spark ignition of explosive gas mixtures (e.g. on oil platforms and similar locations).

Prior to the partially purified liquid stream passing through the vortex-creating device, the stream may be channelled to reduce turbulence. Reduced turbulence in the stream entering the vortex-creating device results in a greater separation efficiency.

The vortex separation device may therefore comprise an inlet flow chamber containing a plurality of walls that define a plurality of channels for channelling the liquid stream. The channels may be parallel or may converge towards the downstream end of the vortex separation device. For example, the channels may converge together at an angle of up to 20° or up to 10°.

The vortex separation device may comprise six or more, seven or more or eight or more walls that define the channels. In one embodiment, the vortex separation device comprises eight walls that define the channels. The walls that define the channels may be formed from a metal or plastics material, which is sufficiently rigid so as not to deform as the liquid stream passes through the device.

The walls are typically longitudinally extending in the direction of the liquid stream through the inlet flow chamber. The walls may also extend towards the centre of the inlet flow chamber (but not necessarily extend radially towards the centre of the inlet flow chamber).

In one embodiment, a channel may be an open-sided channel and may be formed from a base portion and a pair of side walls extending therefrom to form an open-sided channel. In a further embodiment, a channel may be a closed channel and may comprise a base portion and a pair of side walls extending therefrom, the side walls being linked together to form a single continuous wall which defines a closed channel. The walls may be straight, curved or bent. When the walls define an open-sided channel, the walls may converge (either converging at the same extent or to different extents). The open side of the channel typically faces towards the centre of the inlet flow chamber.

The walls or bases are typically fixed to an interior wall of an inlet to the separation unit. Typically, the fixings used to fix the walls/bases to the interior wall of the inlet to the separation unit are chosen to minimise turbulence as the liquid stream passes over the fixings (e.g. use of countersunk screws or rivets). Alternatively, the walls may be integrally formed with the inlet flow chamber.

For example, in one embodiment, the vortex separation device may comprise an inlet flow chamber containing three, four or five (e.g. four) open-sided channels, each channel being defined by a base portion and a pair of (typically convergent) side walls extending from the base portion, wherein the open-sided channels face towards the centre of the inlet flow chamber and the base portions are each fixed to an interior wall of the inlet flow chamber.

In another embodiment, the vortex separation device may comprise an inlet flow chamber containing three, four or five (e.g. four) open-sided channels, each channel being defined by a base portion and a pair of (typically convergent) side walls extending from the base portion, wherein the open-sided channels face towards the centre of the inlet flow chamber and the base portions are each integrally formed with, or form part of, an interior wall of the inlet flow chamber.

The guide walls are typically located upstream of the vortex-creating device and impeller (if present).

The downstream ends of the guide walls may be angled and act as baffles (as described above) integrally formed with the channel-defining guide walls. The ends of the guide walls may be bent at an angle of 40° to 50°, for example 45°, with respect to the upstream end of the guide walls. The guide walls therefore serve to initially reduce turbulence in the liquid stream and then as a vortex-inducing element to introduce a vortex to the liquid stream so that separation of the fluid stream can occur in the separation unit.

Downstream of the vortex-creating device, the vortex separation device also comprises a separator unit, which is typically tubular in shape. As the liquid passes through the separator unit, the higher density components of the liquid move outwardly towards the periphery of the separator unit to a greater extent than the lower density components thereby resulting in separation of the higher and lower density components.

The vortex separation device has an inlet (the vortex separation device inlet) which is connected to an upstream component of the apparatus of the invention. There may be only one such inlet, or there may be present a plurality of openings into the device, each of which constitutes an inlet. As described above, the vortex separation device may be connected downstream of a centrifugal separator described herein. Hence, the first or second outlets of a centrifugal separator described herein may be connected to the inlet of the vortex separation device.

In use, the stream of contaminated water requiring purification will typically enter the inlet (i) under pressure, for example pressure provided by an external pump or pressure differential (e.g. as provided by a head of water). The water pressure will typically drop as the contaminated water passes through the centrifugal separator and is subjected to an initial purification step. A pre-filter pump (iii) is therefore provided upstream of the first filter assembly to provide the necessary water pressure to drive the partially purified water stream through the first filter assembly. The pressure of water entering the first filter assembly is monitored by the pre-filter pressure sensor (vi).

The pre-filter pump (iii) may be, for example, a centrifugal pump, a diaphragm pump or a peristaltic pump. The pumps can be of conventional type and are typically DWQR (Drinking Water Quality Regulator) and/or DWI (Department of Water Inspectorate) certified/approved.

The pre-filter pressure sensor can be, for example, a pressure transducer. Such sensors can be of conventional type and suitable sensors are widely commercially available.

The first filter assembly (v) comprises one or more filter modules for removing particles of a predetermined size and/or removing organic contaminants from the partially purified water stream. In one embodiment, the first filter assembly (v) comprises a filter module for removing particles of a predetermined size and a filter module (e.g. a carbon filter) for removing organic contaminants.

The filter module for removing particles of a predetermined size can have a mesh size of 100 microns of less. The filter module may comprise a single filter element or may comprise two or more filter elements in series having different (e.g. reducing) mesh sizes. For example, a first filter element may have a mesh size of 100 microns or less and a second filter element downstream of the first filter may have a smaller mesh size, for example a mesh size of 50 microns or less.

The filter module (e.g. carbon filter) for removing organic contaminants such as oil residues, hydrocarbons and chlorinated hydrocarbons, can be located upstream or downstream of the filter module for removing particles of a predetermined size.

In one embodiment, however, the filter module (e.g. carbon filter) for removing organic contaminants such as oil residues, hydrocarbons and chlorinated hydrocarbons, is located downstream of the filter module for removing particles of a predetermined size.

After passing through the first filter assembly (v), the pressure of the partially purified water is monitored by the post-filter pressure sensor (vi). Typically there will be a pressure drop across the first filter assembly. The water pressure is boosted by the post-filter pump (vii) to a level compatible with the operation of the reverse osmosis filters making up the second filter assembly (viii).

A pressure control valve (typically motorised) may be provided between the post-filter pump and the second filter assembly. The pressure control valve assists in enabling fluctuations in the pressure of the water entering the reverse osmosis filters to be controlled.

A further pressure sensor may be located between the post-filter pump and the second filter assembly in order to monitor the pressure of the partially purified water entering the second filter assembly. The further pressure sensor is advantageously downstream of the pressure control valve.

The second filter assembly (viii) comprises one or more reverse osmosis filters. For example, there may be two or more (e.g. two) reverse osmosis filters connected in parallel. The reverse osmosis filters remove substantially all remaining contaminants from the partially purified water stream. Examples of reverse osmosis filters that may be used include RO filters available from Amfor and Axeon.

The further purified water emerging from the second filter assembly passes through a UV steriliser unit (ix) that kills any remaining microbial contaminants such that the output from the UV steriliser is potable water.

The apparatus comprises an electronic controller for controlling the operation of the apparatus. The electronic controller is typically in communication with the sensors (iv) and (vi) and, when present, any further pressure sensors, and also the pre-filter and post filter pumps. The electronic controller may therefore be used to control the water pressure at various locations in the apparatus.

Preferably, the apparatus comprises one or more devices located at or near the outlet (x)) for monitoring the purity of the water at the outlet.

Preferably also, the apparatus comprises one or more devices located at or near the inlet (i)) for monitoring the levels of contaminants in the contaminated water stream entering the apparatus.

Examples of devices for monitoring the purity of the potable water or the levels of contaminants in the contaminated water stream include devices for monitoring pH, temperature, dissolved solids (e.g. nitrates, metals such as iron and manganese), water hardness, bacterial count (e.g. E coli), odour, organic materials such as solvent residues (e.g. hydrocarbons and chlorinated hydrocarbons), suspended solids and turbidity. One or more flow meters may also be mounted at suitable locations, for example at or near the outlet.

The devices for monitoring the purity of the potable water and the levels of contaminants in the contaminated water stream are typically linked (via wiring or wirelessly) to the electronic controller.

In one particular embodiment, the invention provides an apparatus for providing potable water, which apparatus comprises a plurality of components linked in series to provide a flow path through the apparatus, wherein the plurality of components comprises:

(i) an inlet for a stream of contaminated water requiring purification;

(i-a) one or more devices for monitoring levels of contaminants in the contaminated water stream;

(ii) a centrifugal separator for separating the contaminated water stream into a partially purified water stream and a contaminant stream;

(iii) a pre-filter pump;

(iv) a pre-filter pressure sensor (v) a first filter assembly comprising (v-a) one or more filter modules for removing particles of a predetermined size and (v-b) one or more filter modules (e.g. carbon filter modules) for removing organic contaminants from the partially purified water stream;

(vi) a post-filter pressure sensor;

(vii) a post-filter pump;

(vii-a) a pressure control valve downstream of the post-filter pump (vii);

(vii-b) a further pressure sensor downstream of the pressure control valve (vii-a);

(viii) a second filter assembly comprising a plurality (e.g. two) of reverse osmosis filters (e.g. arranged in parallel);

(ix) a UV steriliser unit;

(ix-a) one or more devices downstream of the UV steriliser unit for monitoring the purity of water emerging from the UV steriliser unit; and optionally a water flow sensor or flow meter; and (x) an outlet for purified potable water;

and wherein the apparatus further comprises an electronic controller for controlling and monitoring the operation of the apparatus and a telecommunications device allowing connection of the electronic controller to a remote controller and monitoring station.

The components (i) to (x) may be arranged, from an upstream (inlet) end of the apparatus to a downstream (outlet) end of the apparatus, in the order (i), (i-a), (ii), (iii), (iv), (v), (vi), (vii), (vii-a), (vii-b), (viii), (ix), (ix-a) (x).

In another aspect, the invention provides a method of providing potable water which method comprises passing a stream of contaminated water through an apparatus as defined herein.

The invention will now be illustrated in more detail (but not limited) by reference to the specific embodiment shown in the accompanying drawings, which is an apparatus for the purification of water.

DETAILED DESCRIPTION OF THE INVENTION

Figure 1:
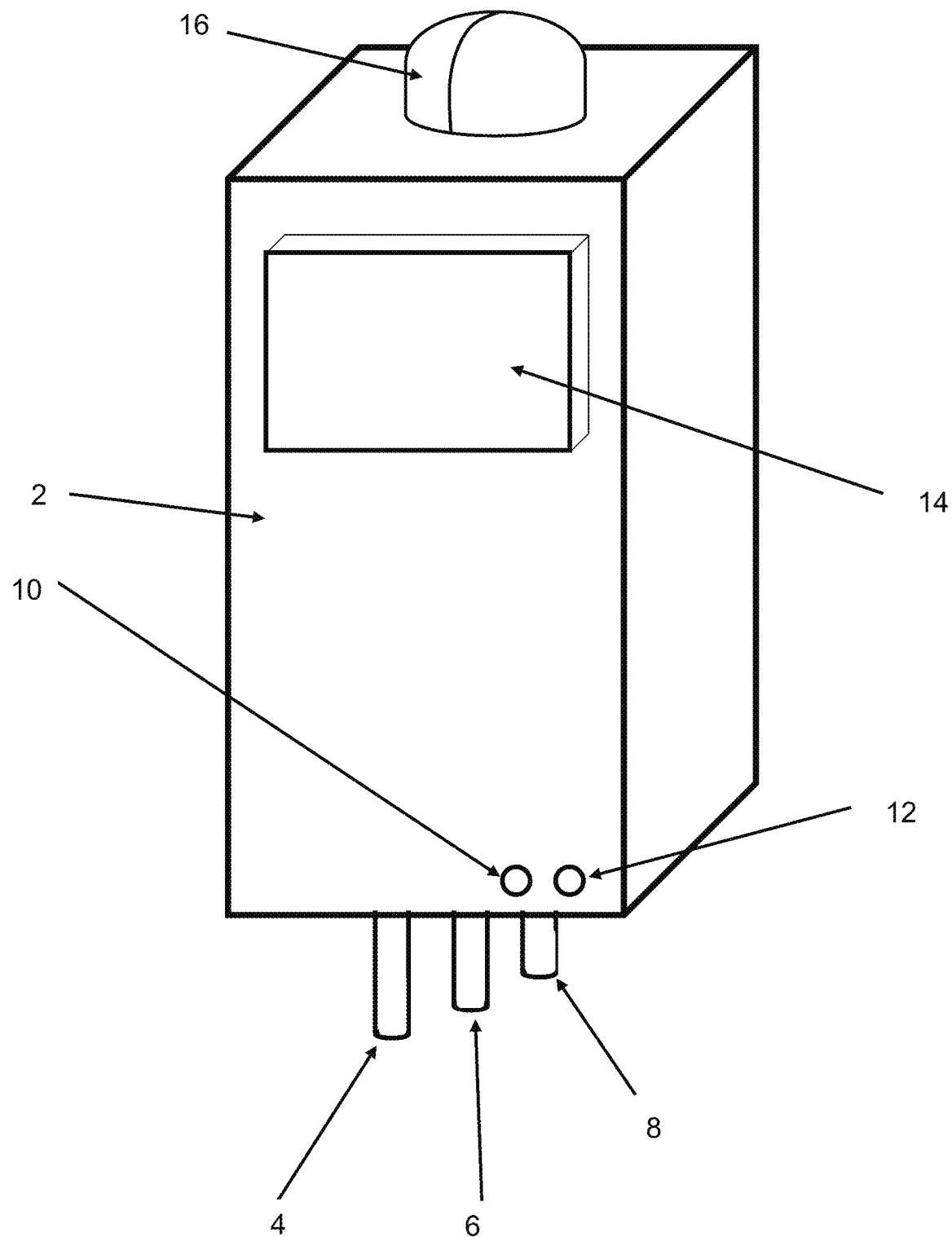
FIG. 1 is a perspective view of the outer casing of an apparatus according to one embodiment of the invention.
Figure 2:
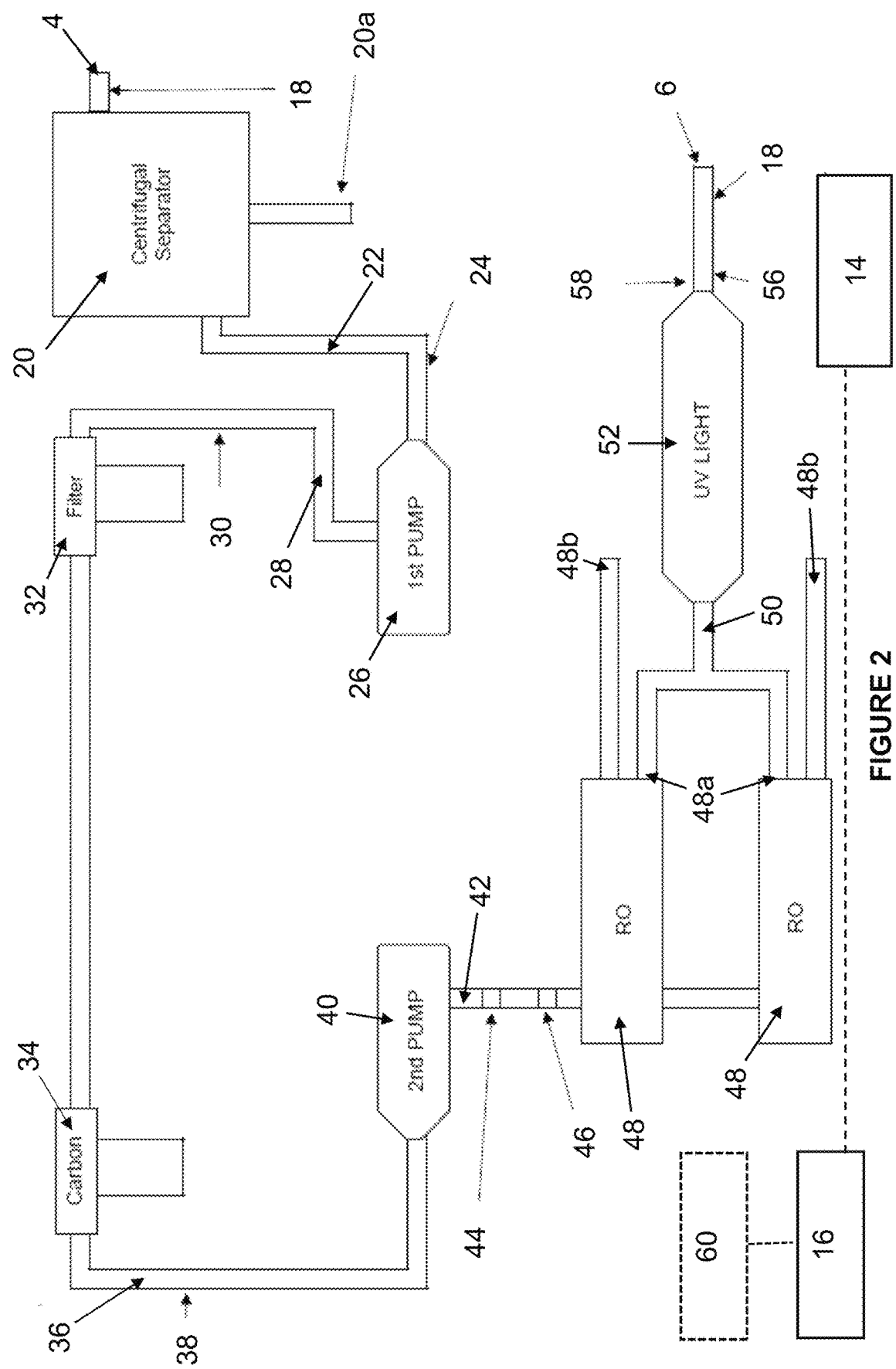
FIG. 2 is a schematic view showing the internal components of the apparatus of FIG. 1.

An apparatus according to one embodiment of the invention is illustrated in FIGS. 1 and 2. As shown in FIG. 1, the apparatus comprises a casing (2) which may be formed, for example, from metal (e.g. steel or aluminium) panels attached (e.g. by means of screws or bolts) to a supporting framework (not shown).

The casing (2) is provided with a water inlet (4) which can be connected to a source of water requiring purification. After passing through the apparatus, purified potable water passes out through potable water outlet (6) to a suitable collector or container (not shown). A waste outlet (8) is provided through which waste water is discharged from the apparatus.

Set into the casing (2) are a power LED light (10) (which indicates when the apparatus is connected to a source of electricity) and a water purity alarm LED (12) which lights up when the purity of the water leaving the apparatus is insufficiently pure.

A controller (14) provided with a visual display (14) is set into a front panel of the apparatus and a communications antenna (16) is mounted on a top panel.

The interior components of the apparatus are shown in FIG. 2.

The apparatus is connected to a pressurised (e.g. by means of an external pump) source of water requiring purification. The water requiring purification enters the apparatus through a water inlet (2) and passes immediately through an incoming water purity measurement station (18). At the water purity measurement station (18), the purity of the water is determined by means of a variety of measurements such as pH, bacterial count (e.g. *E. coli* levels), water hardness, dissolved solids (e.g. nitrates, iron, manganese and other metals), plastics microparticles, odour, conductivity, suspended solids, organic matter, organic solvent residues and turbidity. The results of the tests are transmitted to the control unit (14) which is connected to the incoming water purity measuring station either by wiring (not shown) or wirelessly.

After passing through the incoming water purity measuring station (18), the water flows into a centrifugal separator (20) which can be set up to remove oil residues from the water or to remove particulate matter (such as sand, soil particles, grit and plant matter). The centrifugal separator can be a separator as described in our earlier patent application WO2015/082502 (and in particular the separators illustrated in FIGS. 9 to 16 therein), or the separator as described in our earlier patent application PCT/EP2018/054681 (with particular reference to the separators illustrated in FIGS. 1 to 14B of PCT/EP2018/054681), the contents of each of which are incorporated herein by reference. A waste water stream containing impurities passes out though waste water outlet (20a) which is connected to the waste water outlet (8) shown in FIG. 1.

The partially purified water emerging from the centrifugal separator (20) passes along a length of pipe (22) in which is mounted a temperature transducer (24). The temperature transducer is linked (either by wiring or wirelessly) to the controller (14). The length of pipe (22) is connected to a pump (26) which pumps the partially purified water along a length of pipe (28) to a filter (32). A pressure transducer (30) is mounted in the wall of the pipe (28) and measures the pressure of water in the pipe prior to it passing through the filter (32). the pressure transducer (30) is also linked by wiring (not shown) or wirelessly to the controller (14). The filter (32) is typically one which can remove particles of less than 10 microns, for example less than one micron.

The particulates filter (32) is connected by a length of pipe to a carbon filter (34) which removes residual organic substances, and in particular traces of organic solvents and petroleum residues. The carbon filter can be of a standard commercially available type. The carbon filter is connected by a length of pipe (36) to a second pump (40). A further pressure transducer (38) (which also communicates with the controller (14) is mounted in the wall of the pipe (36). The second pump (40) is connected by pipework (42) containing a pressure control valve (44) and a further pressure transducer (46) to a pair of reverse osmosis cartridges (48) connected in parallel. By means of the two pressure transducers (30) and (38), the pressure drop across the filters (32) and (34) can be measured and therefore it is possible to determine the extent to which the pressure of water passing into the reverse osmosis cartridge needs to be boosted by the pump (40). The reverse osmosis cartridges are of standard type and examples of such cartridges are the RO cartridges available from Amfor and Axeon.

Each of the reverse osmosis cartridges (48) has a purified water outlet (48a) and a waste water outlet (48b). The waste water outlets (48b) of the reverse osmosis cartridges (48) are both connected to the waste outlet (8) through which waste water is discharged from the apparatus.

The outputs from the two purified water outlets (48a) are combined and connected via a length of pipe (50) to a UV radiation steriliser unit (52). Water passing through the UV radiation steriliser unit is sterilised by UV radiation before emerging from the unit into pipe (54) which is fitted with a temperature transducer (56), flow meter (58) and one or more devices (not shown) for measuring the purity of the purified water. The pipe (54) leads to the potable water outlet (6).

The controller (14) is connected to the communications antenna (16) which provides a telemetry facility enabling the operation of the apparatus to be monitored and controlled remotely from a remote controller (60).

The controller is provided with a touch screen display which provides a visual output of the status of the apparatus and its operation, as well as details such as flow rates, temperatures, pressures and the purity of the water entering and leaving the apparatus. The touch screen enables the inputting of information and commands to enable the apparatus to be controlled locally as well as from a remote controller.

The apparatus can be powered by an external power source (not shown) and the casing (2) is provided with an on/off power switch (not shown). The apparatus may also be provided with batteries (typically rechargeable) that can be used to power the apparatus in the event of an external power failure or non-availability of a mains power source.

Figure 3:
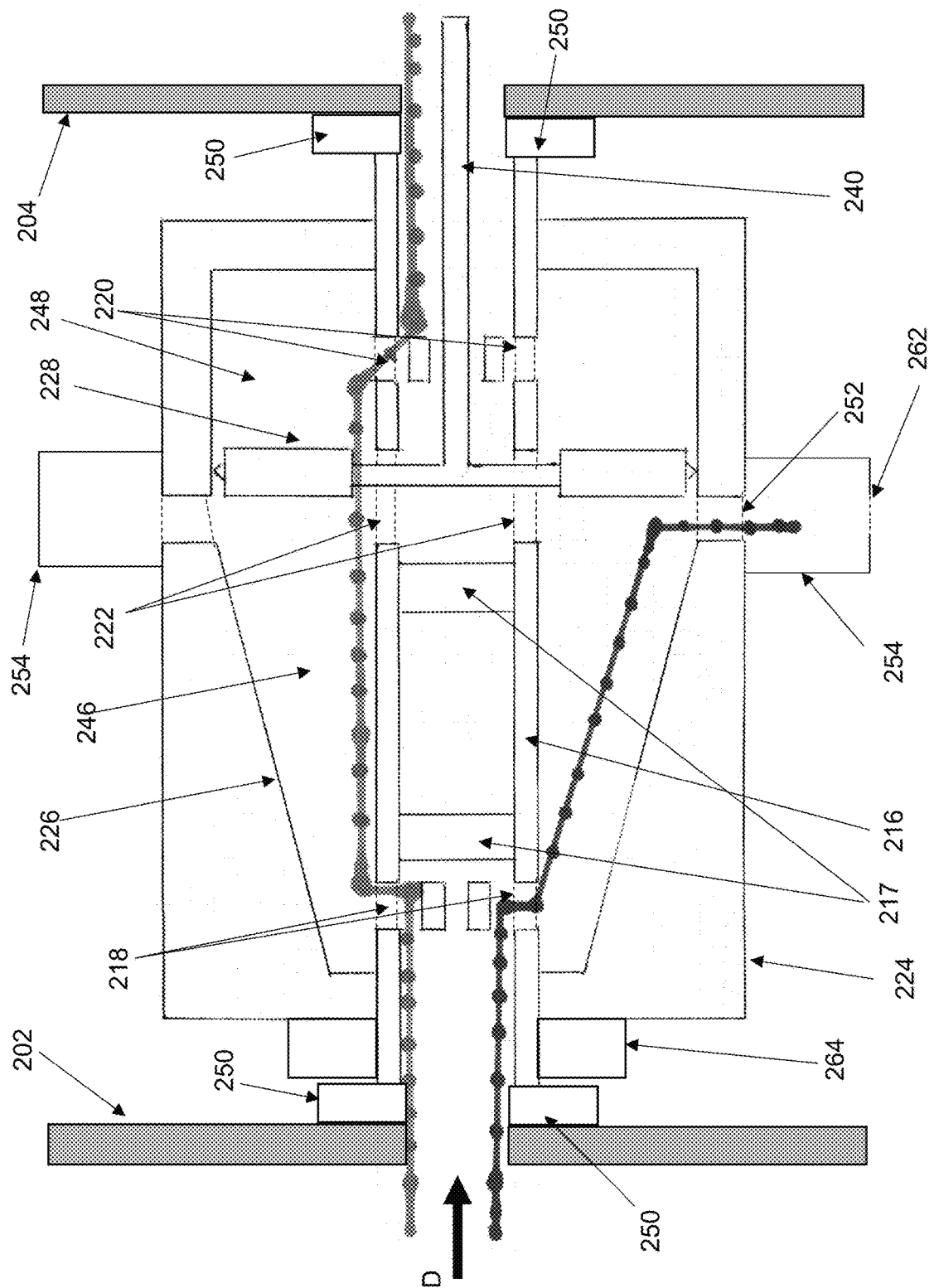
FIG. 3 shows a cross-sectional view of a centrifugal separator (ii) that can be used in the apparatus according to the first embodiment of the invention.
Figure 4:
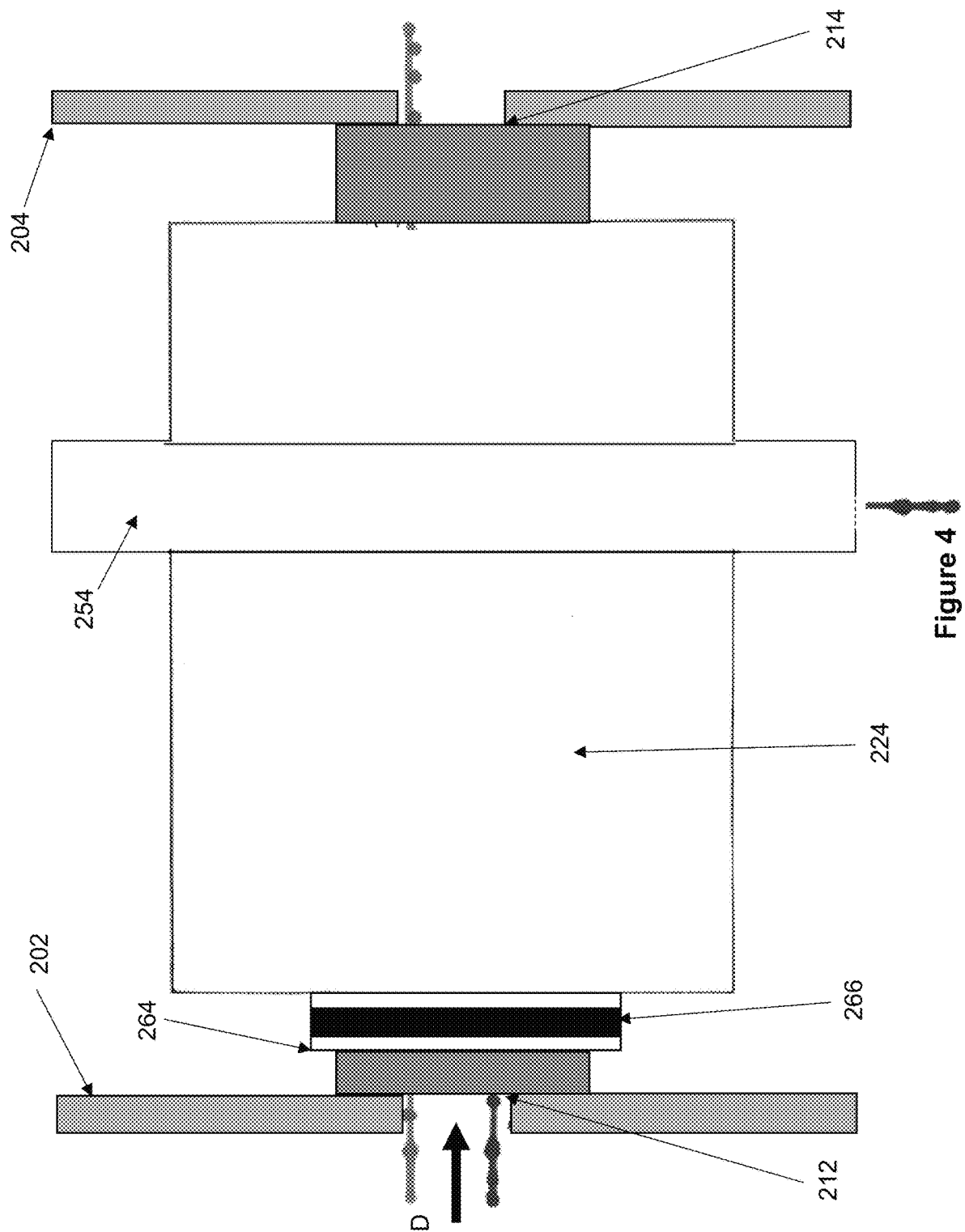
FIG. 4 shows an external side view of the centrifugal separator shown in FIG. 3.

An example of a centrifugal separator for use in the apparatus described herein is illustrated in FIGS. 3 to 6. As shown in FIGS. 3 and 4, the apparatus includes a support structure comprising a pair of end walls 202, 204 connected together by a plurality of (for example, eight) threaded rods (not shown) which are secured to the end walls 202, 204 by means of nuts either side of each wall.

Mounted on the inwardly facing sides of the two end walls 202, 204 are bearing assemblies 250. The two ends of a tubular shaft 216 (referred to below as tube 216) extend into the bearing assemblies and are rotatably mounted therein. The bearing assemblies typically comprise a cylindrical casing containing a plurality of bearings surrounding the ends of the tube 216 and in which the ends of the tube can rotate. The bearings can be of conventional type and thus, for example, can be taper bearings, roller bearings, needle bearings or an array of ball bearings.

Figure 5:
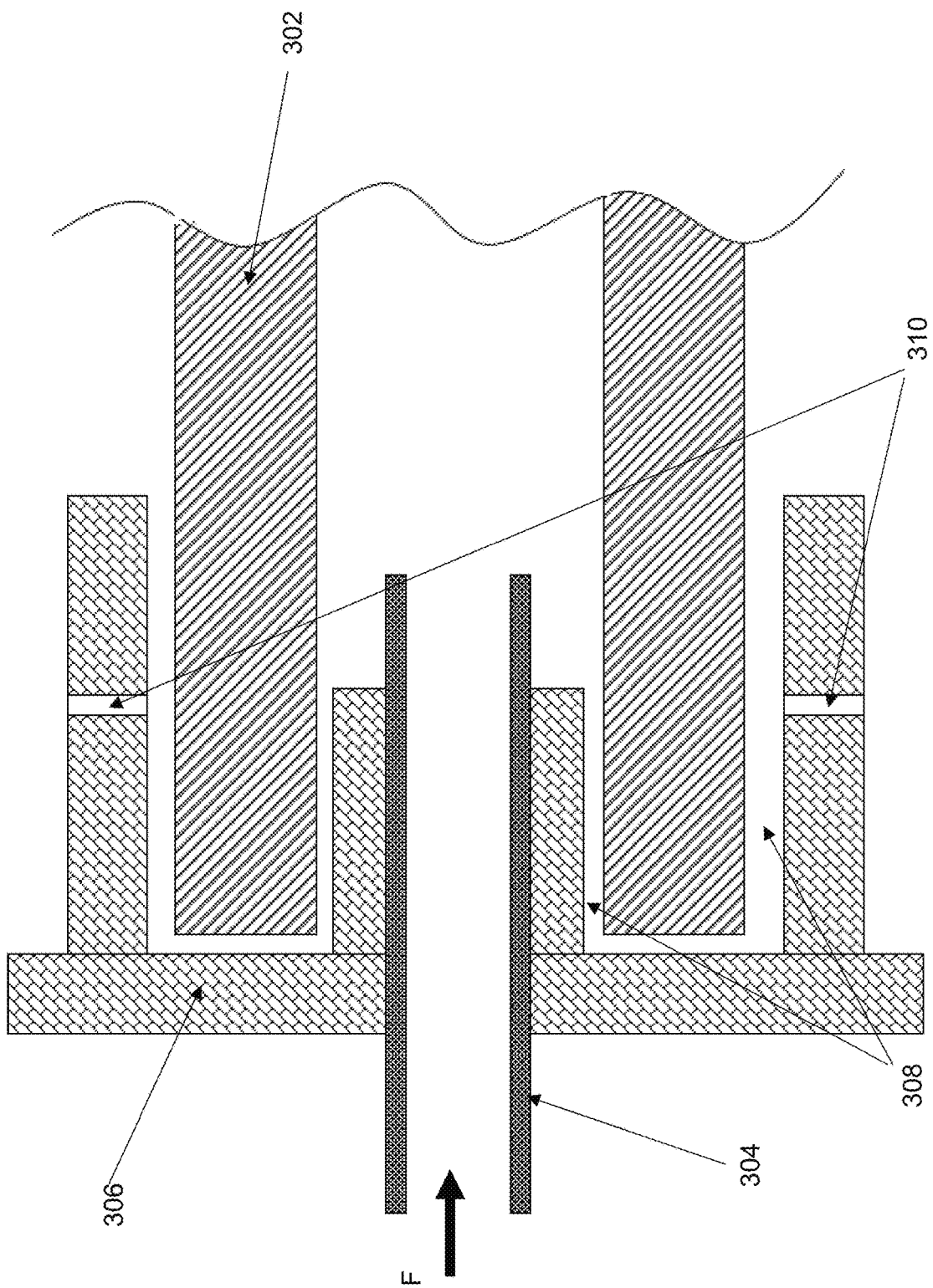
FIG. 5 shows a cross-sectional view of a labyrinth seal used to connect a fluid feed pipe or an outlet pipe to the centrifugal separator of FIGS. 3 and 4.

One or both bearing assemblies (and more usually the bearing assembly 202) can be constructed so as to form a labyrinth seal as shown in FIG. 5.

Mounted on tube 216 is a cylindrical drum 224. The drum 224 is fixed to the tube 216 such that the drum rotates with the tube 216. The drum can be formed from a suitably tough plastics material or a corrosion resistant metal such as stainless steel, or a combination of plastics and metallic materials and, viewed from the exterior, is of generally cylindrical form.

Tube 216 has two ends—a fluid supply end 212 and an outlet end 214. At the fluid supply pipe end of the drum, the drum has a conical inner surface 226. The conical inner surface 226 is shaped such that a stream of contaminated water entering the drum is diverted to the outermost regions of the drum where the centrifugal forces are the greatest. The conical inner surface provides this diversion without imparting substantial turbulence on the stream. The conical inner surface may be an inner surface of the cylinder (in this case, whilst the outer wall of the cylinder is of constant width, the inside of the cylinder does not have a constant diameter). Alternatively, the conical inner surface may be a surface of a separate component which is placed within the cylinder to provide the same internal shape as described above. Where the conical inner surface is a surface of a separate component, the component may be formed from a material which is the same as or different from the material from which the drum is formed. For example, a separate component providing the conical inner surface may be formed from a corrosion resistant metal such as stainless steel or from a suitable tough plastics or composite material.

The outer surfaces of the fluid supply pipe and the outlet pipe(s) can be sealed against the inner surfaces of the two ends of the tube 216 and optionally against the inner surface of collector outlet 262 by means of labyrinth seals, as shown in FIG. 5.

The labyrinth seals 306 have an inlet for receiving fluid feed pipe 304 and a circular recess for receiving an end of tubular shaft 302 (equivalent to tube 216 in FIG. 3) of a drum 224 which is in fluid communication with the first chamber in the drum. The stream of contaminated water enters the seal through fluid feed pipe 304 in direction F as shown in FIG. 5. Whilst the fluid feed pipe 304 and labyrinth seal 306 do not rotate when the apparatus is in use, bearings within the labyrinth seal (not shown) allow the end of the tubular shaft 302 to rotate inside the labyrinth seal. The labyrinth seal contains tortuous paths 308 (typically less than 1 mm in width) which prevent leakage of the water from the seal. The use of labyrinth seals means that if the air feed pressure is greater than the water pressure being processed, then the water cannot push past the labyrinth seal and leak out. The labyrinth seal therefore provides a means for connecting a static, non-rotating fluid feed pipe to the rotating tubular shaft and drum, whilst preventing leaking of the water. The labyrinth seals can similarly be used to connect outlet pipes to the drum.

The labyrinth seals 306 also comprise air inlets 310 which are in fluid communication with centre of the seal by means of the paths 308. Air can be drawn into the labyrinth seal through the air inlets, either as a result of the pressure of the water passing through the seal, or by using an external pressured air source to inject pressured air into air inlet 310. When the air pressure inside the labyrinth seal is sufficient, the drum shaft 302 will be suspended, taking the weight of the drum off the bearings in the seal. This means that the labyrinth seal is virtually friction free and therefore lasts longer compared to conventional seals, which easily degrade when the contaminated water contains particulate matter, such as sand and/or grit.

The tube 216 has two circumferential arrays of elongate, angled slots 218, 220 and a plurality (in this embodiment three) of elongate longitudinal slots 222 located around the circumference of the tube. The function of the holes and slots is described below.

The pipe bore is blocked by blocking elements 217 in the form of discs each having an annular sealing element set into its outer edge to form a seal against the inner wall of the pipe. The blocking elements or blanks prevent fluid from passing along the pipe bore.

The interior of the drum is partitioned into a first chamber 246 and a second chamber 248 by disc assembly 228. Holes in disc assembly 228 provide fluid communication between the first and second chambers.

Figure 6:
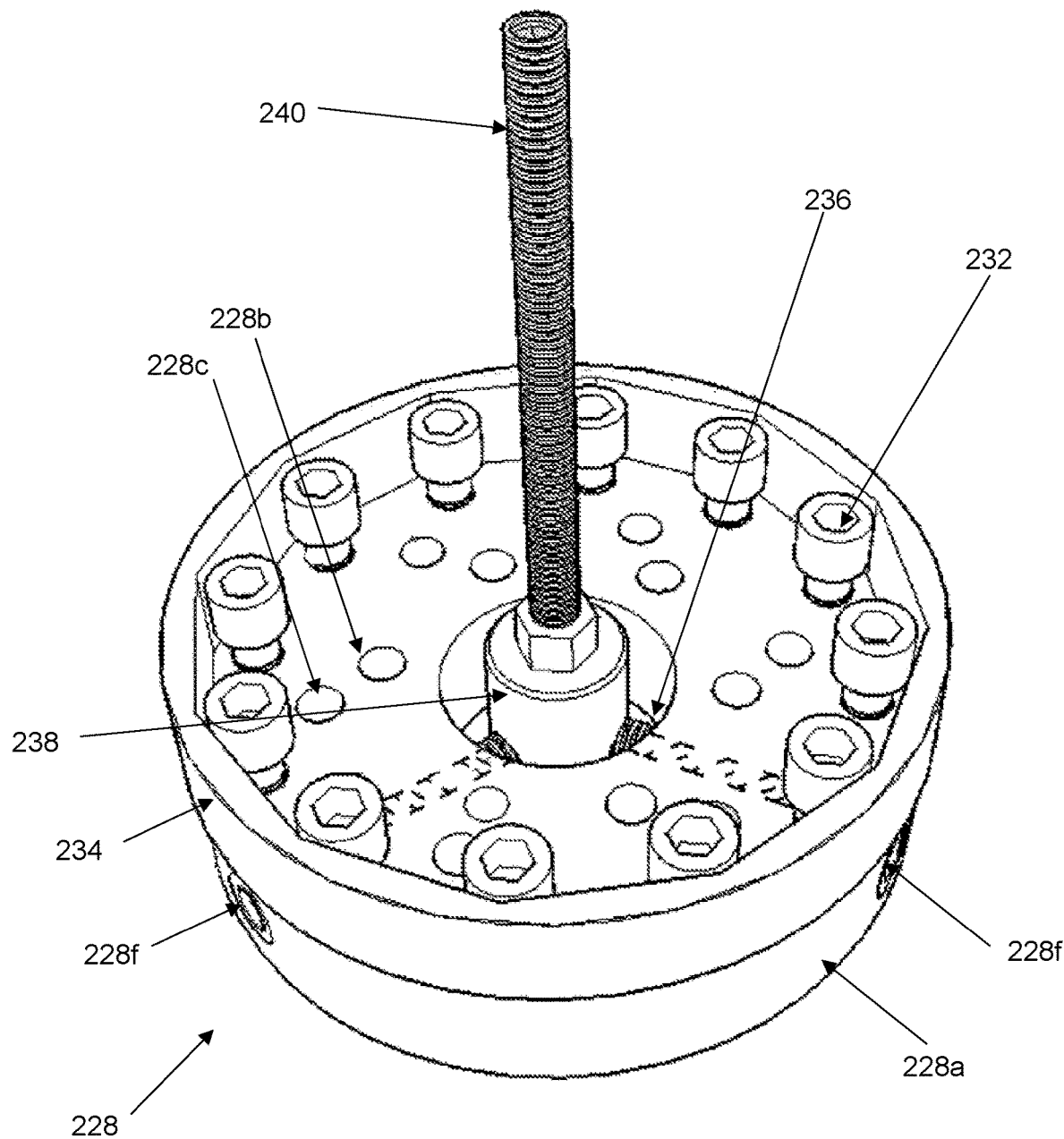
FIG. 6 shows the disc assembly, which acts as the wall member in the centrifugal separator of FIGS. 3 and 4.

The intermediate disc assembly 228, shown in more detail in FIG. 6, comprises a disc 228a of a transparent plastics material, although it could instead be formed from a non-transparent plastics material or a corrosion resistant metal such as stainless steel. The disc 228a has three circumferential arrays of holes. Seated in the outermost holes are bolts 232. Bolts 232 serve to hold in place an annular sealing element 234 which is stretched around the bolts. The annular sealing element 234 of the intermediate disc assembly 228 sits tightly against the inner surface of the drum. The sealing element 234 is formed from a suitable elastomeric sealing material. Radially inwardly of the holes for bolts 232 is a circumferential array of six holes 228c through which the threaded rods (not shown) pass, which secure disc assembly 228 to the drum. Radially inwardly of holes 228c are the holes 228b of which, in this embodiment, there are six. Holes 228b allow fluid communication through the disc 228a.

In addition to the central hole 228e and three circumferential arrays of holes 228b, 228c and 228d, the disc 228a has three passages 228f extending from the radially outer edge of the disc to the central hole 228e. Located within the three passages 228f are three fastening bolts 236. The inner ends of fastening bolts 236 extend through the slots 222 in the tube 216 and are anchored in a cylindrical sealing plug 238. The sealing plug 238 is attached to a threaded actuator rod 240 which extends along the interior of the tube and out through a sealing gland associated with the pipe 214. The end of the threaded actuator rod can be received in a rotatable actuator device, the rotation of which gives rise to longitudinal (axial) movement of the actuator rod and hence longitudinal movement of the sealing plug 238 along the tube. Thus, the actuator rod 240 can be used to move the sealing plug and, because the disc 228 is attached to the sealing plug 238, movement of the sealing plug will also result in axial movement of the disc 228. Movement of the sealing plug 238 and disc 228 enables the effective size of the opening defined by the slots 252 to be varied, for example by increasing the opening size to facilitate the passage therethrough of more viscous materials or larger particulates.

By changing the size of the slots 252, the separated liquid stream can be split at different points, to allow one separated material to pass through slot 252 and the other to continue to pass through the drum towards the outlet pipe 214.

Attached to the outer surface of the drum is an array of vanes (not shown). In this embodiment, the vanes are longitudinally oriented but they could instead be oriented at an angle, for example, of up to 45° (e.g. from about 15° up to 40°, or from about 20° up to 37°, or from about 25° up to 35°, or from about 30° to about) 32° with respect to the rotational axis of the tube 216. In one embodiment, the vanes are formed in pairs, each pair being constituted by two sides of a strip of metal of channel section. The third (i.e. intermediate) side of the channel section strip is attached to the drum cylinder by means of rivets or other fastening elements. Between each vane, slots 252 are positioned to provide an opening into the interior of the drum.

A static collector device 254 encircles the rotating drum but does not rotate with it. The collector device 254 comprises an annular channel-shaped structure, the open face of the channel shaped structure facing inwardly towards the rotating drum. The channel shaped structure has an interior circumferential channel enclosing the vanes on the outer surface of the rotating drum. There is a small clearance between the inner edges of the channel-shaped structure and the outer surface of the rotating drum.

The collector device 254 does not rotate with the rotating drum but is fixed to the support structure 202, 204. The vanes on the outer surface of the drum form a fan seal which reduces the air pressure within the circumferential channel and hence draws air through the gap between the outer surface of the drum and the collector device. This serves to prevent leakage of materials through the gap between the collector device and drum. Means (not shown) may be provided for adjusting the gap between the outer surface of the drum and the collector device should this be considered necessary or desirable to assist the prevention of leakage between the drum and the collector device.

At its lower end (the term "lower" referring to its orientation in use), the channel-shaped structure has a circular or oval opening 262 which defines an outlet for the collector. The opening 262 is connected to a tube for carrying away materials passing through the opening.

The rotation of the rotating drum is driven by a drive belt 266 which engages with a drive wheel 264. The drive belt is linked to a hydraulic powered turbine, a high-pressure air powered turbine or a motor (not shown).

In one particular embodiment, the apparatus can be used to separate heavily contaminated water in the form of an oil-water sludge into a predominantly water-containing component and a predominantly oil-containing component.

Thus, an oil-water sludge is pumped through an inlet pipe (see FIG. 3) in direction D and thence into the tube 216 which under the influence of the drive belt 266. The passage of oil-water sludge along the interior of the tube is blocked by blocking element 217 and therefore it passes into the centrifugal chamber 246 through the slots 218 in the wall of the tube. The movement of the sludge into the chamber is assisted by the centrifugal force imparted by the rotating tube. Inside the chamber 246, the conical inner surface 226 guides the fluid stream to the outermost region of the drum, in a way to minimise turbulence. The centrifugal force created by the rotation of the drum causes separation of the oil and the water in the sludge. Since water is denser than oil, the water moves preferentially to the outer region of the drum and passes out though the holes 252 and into the collector device 254, from which it exits through opening 262 and into the pipe (22) (see FIG. 2) and then on past the temperature transducer (24) to the pump (26). The remainder of the fluid (the contaminant stream), which by this time contains much less water, passes through the holes 228b in plate 228 and back into the interior of the tube 216 through slots 220. From there, the oil passes out through the pipe 214 and is collected. The position of plate 228 can be altered to vary the amount of fluid passing through slots 252. In the embodiment shown, plate 228 can be moved to partially block holes 252, however in other embodiments, the plate can be moved to completely block holes 252.

An apparatus substantially as shown in FIGS. 3 to 6 has been used to separate a 50:50 water:oil mixture. The separated water component has a residual oil content of 18.51 ppm (0.001851%) and the separated oil component had a residual water content of 0.25%.

Alternatively, when the fluid stream comprises heavy particles, the sealing plug 238 can be positioned such that it completely blocks holes 252. When holes 252 are blocked any heavy particles, for example metals particles, are trapped in the drum with the remaining fluid passing through plate 228 and out through the longitudinal tube's outlet end 214. Then with the fluid supply pump shut off but with the drum still rotating the sealing plug 238 can be positioned to open holes 252 to recover any heavy material that has been trapped in the drum.

It has been found that, using the apparatus as described above, good separation of oil from water can be achieved. In order to maximise the separation of water and oil, the speed of rotation of the drum can be varied by simple trial and error until an optimal speed is found.

An apparatus substantially as shown in FIGS. 3 to 6 has also been used to separate sand and grit from water. A slurry of sand in water (approximately 13.4% sand) was subjected to a series of separations carried out at different rotational speeds. Separated sand was collected in the collector 254 whereas water from which sand particles had been removed was collected through outlet 214.

At a rotational speed of 1500 rpm, the water collected through outlet 214 contained 59 mg/ml (0.0059%) residual sand.

At a rotational speed of 1772 rpm, the water collected through outlet 214 contained 46 mg/ml (0.0046%) residual sand.

At a rotational speed of 2250 rpm, the water collected through outlet 214 contained 19 mg/ml (0.0019%) residual sand.

On the basis of the above results, it is envisaged that removal of substantially all of the sand from the water would be achieved at a rotational speed of about 3500 rpm.

Thus, although the basic purpose of the centrifugal separator is to bring about partial purification of the contaminated water, it can in fact reduce impurities (particularly particulates) to very low levels.

Figure 7:
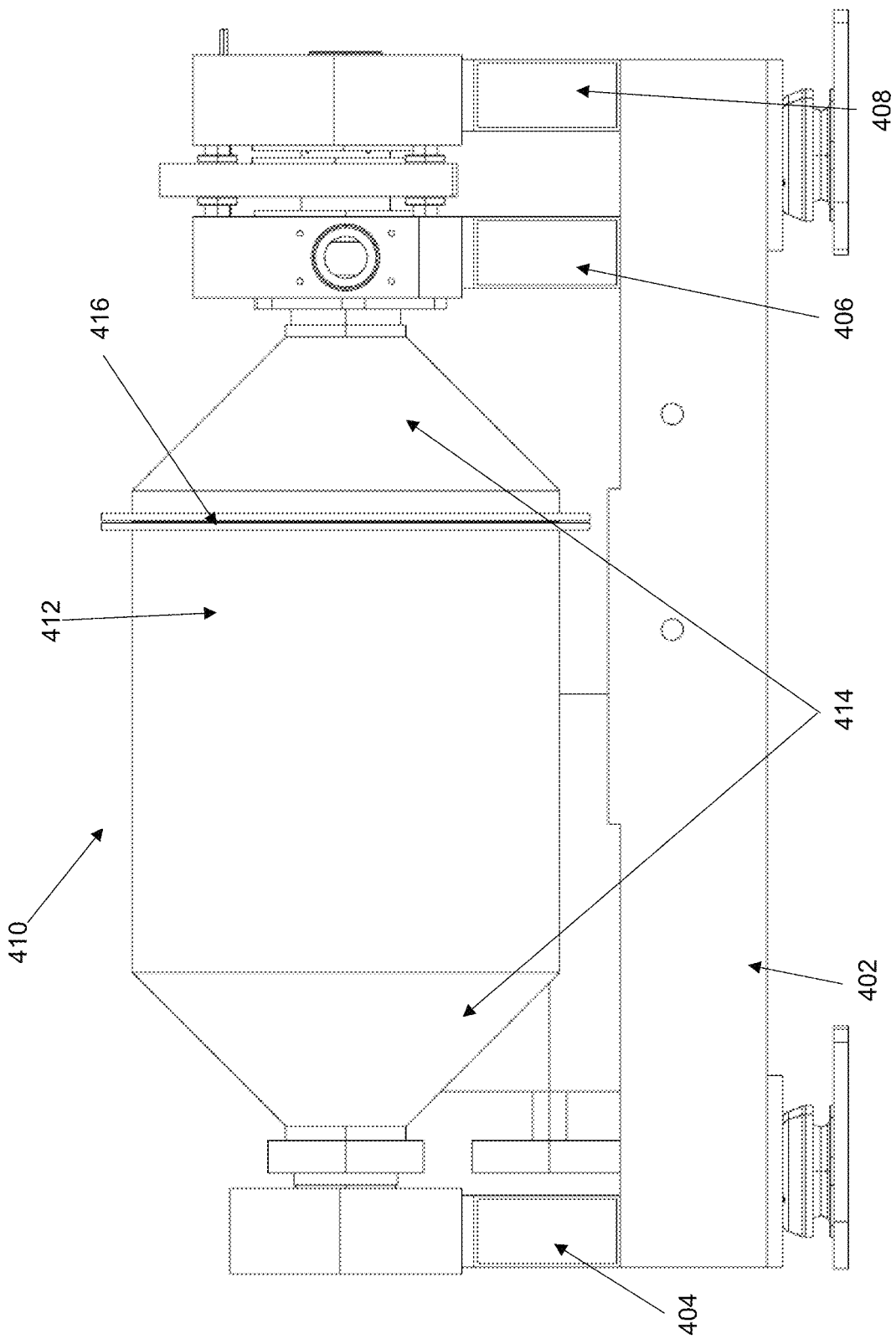
FIG. 7 shows an external side view of a centrifugal separator in an apparatus according to a second embodiment of the invention.
Figure 8:
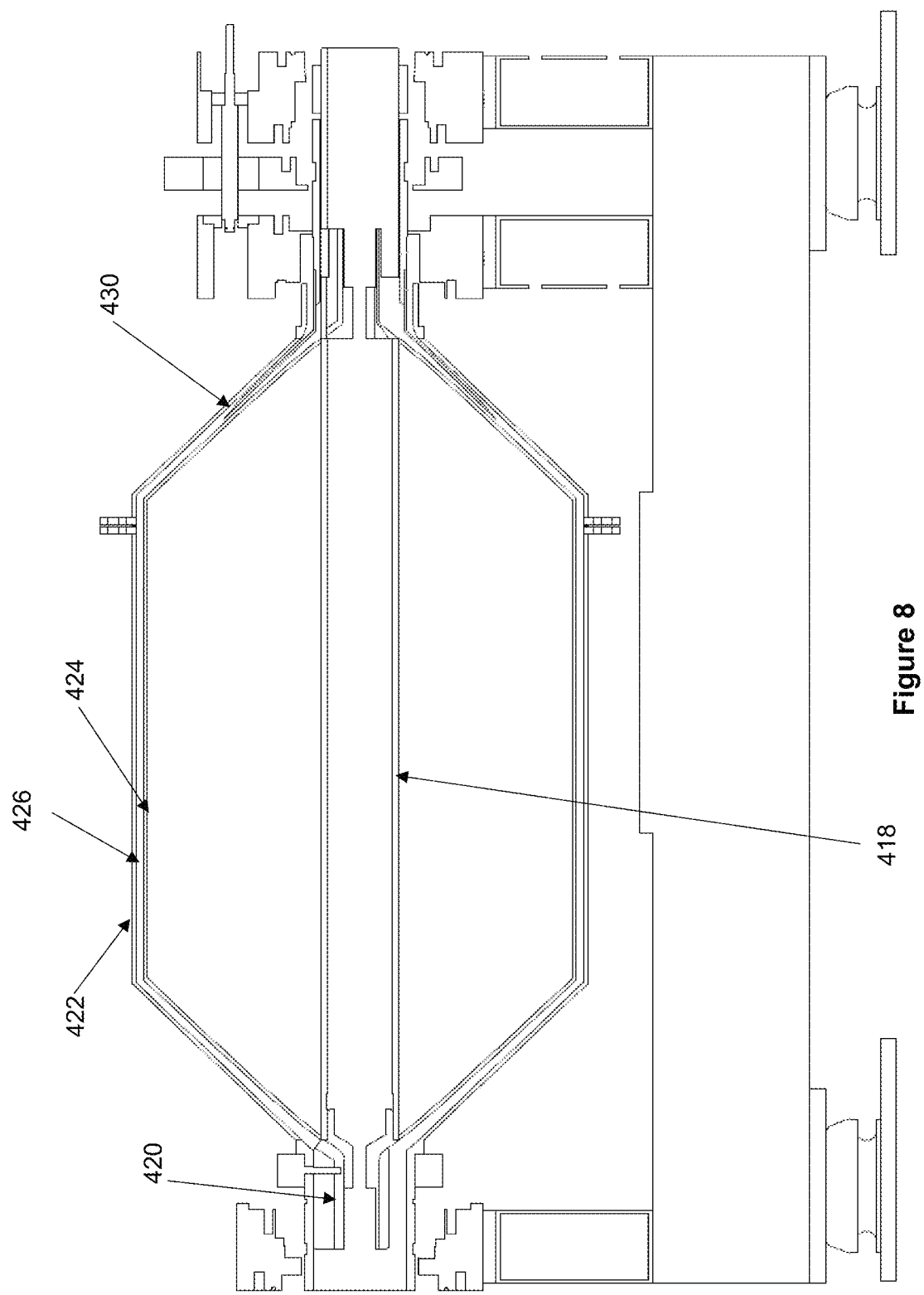
FIG. 8 shows a simplified cross-sectional view of the centrifugal separator shown in FIG. 7.
Figure 9:
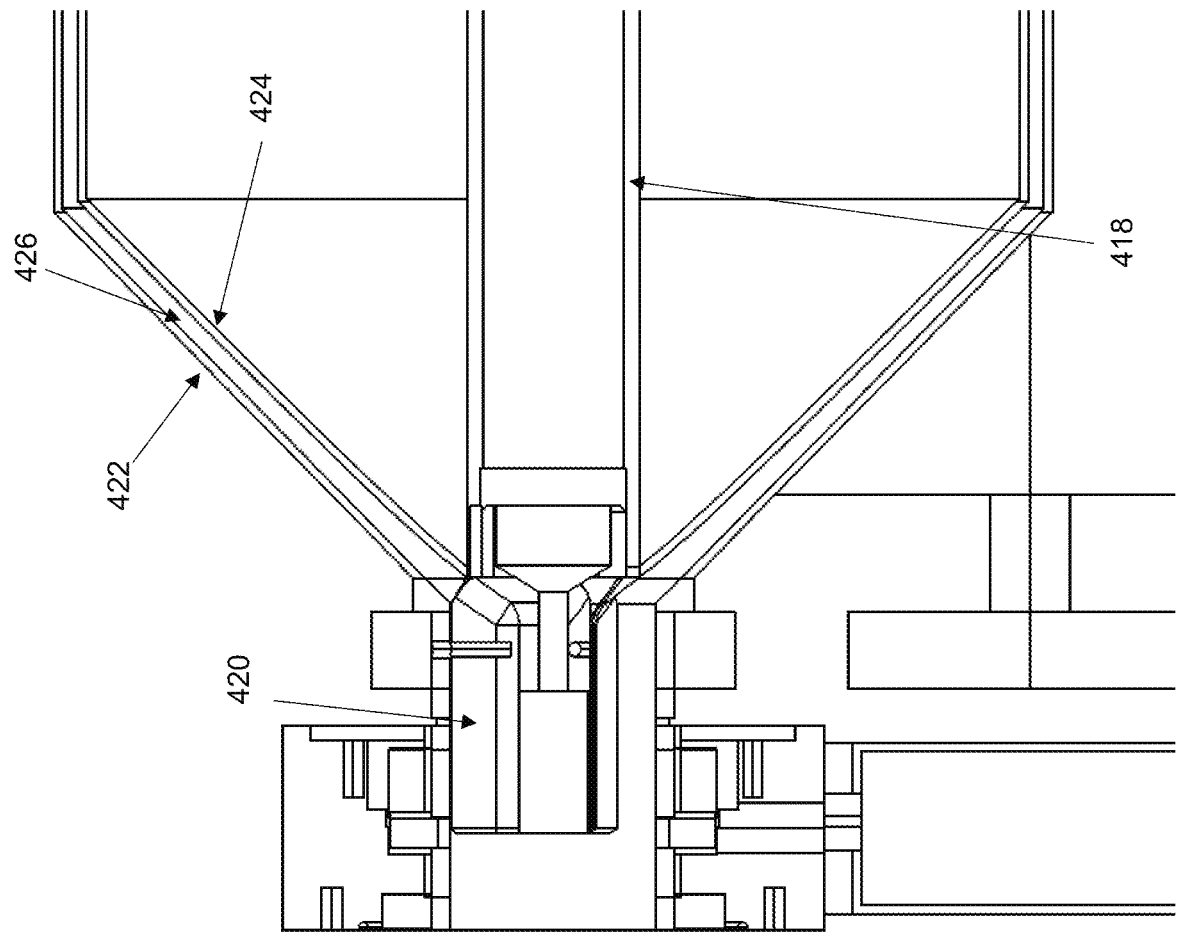
FIG. 9 shows a cross-sectional view of the inlet end of the centrifugal separator shown in FIG. 7.
Figure 10:
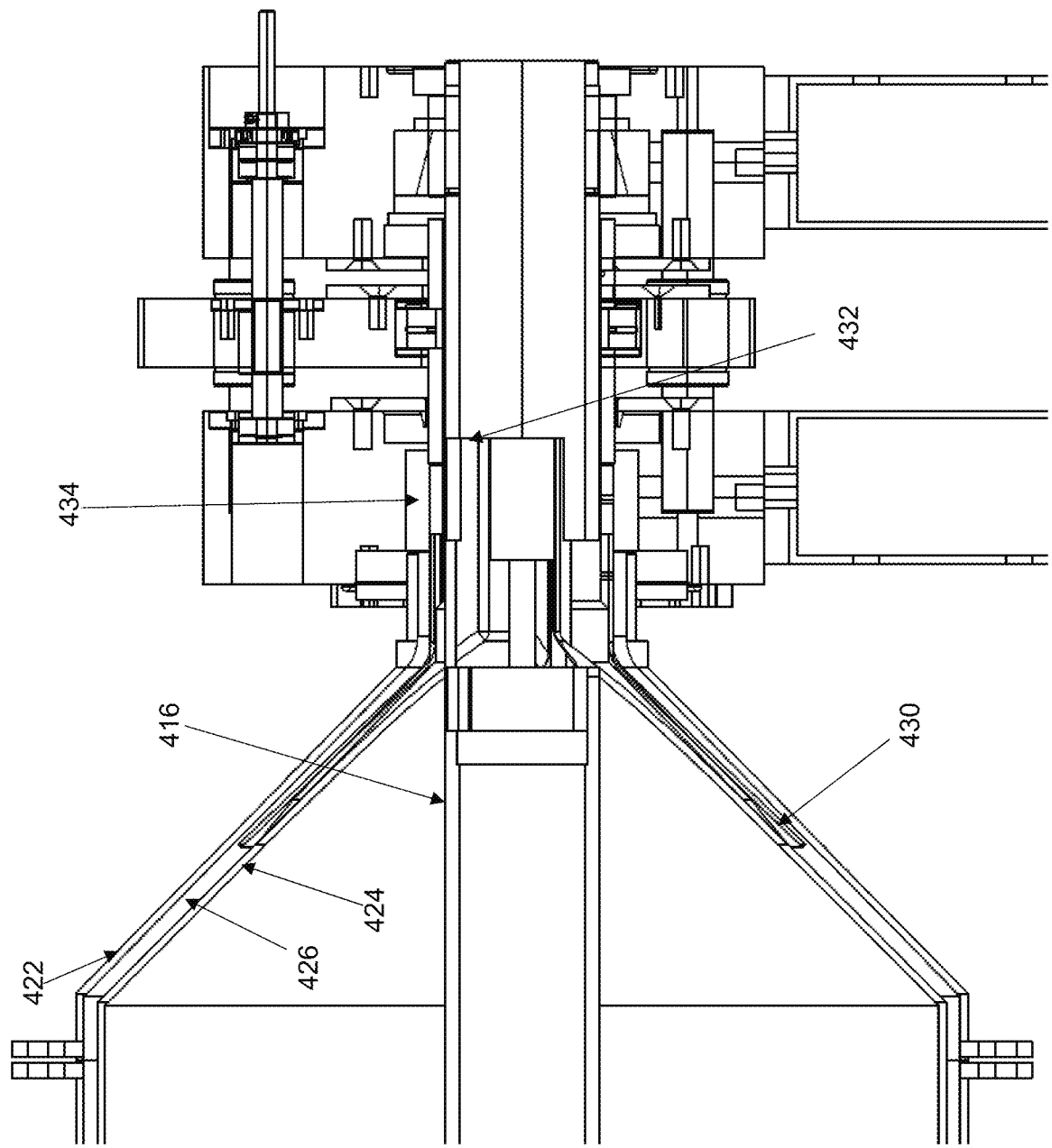
FIG. 10 shows a cross-sectional view of the outlet end of the centrifugal separator shown in FIG. 7.
Figure 11:
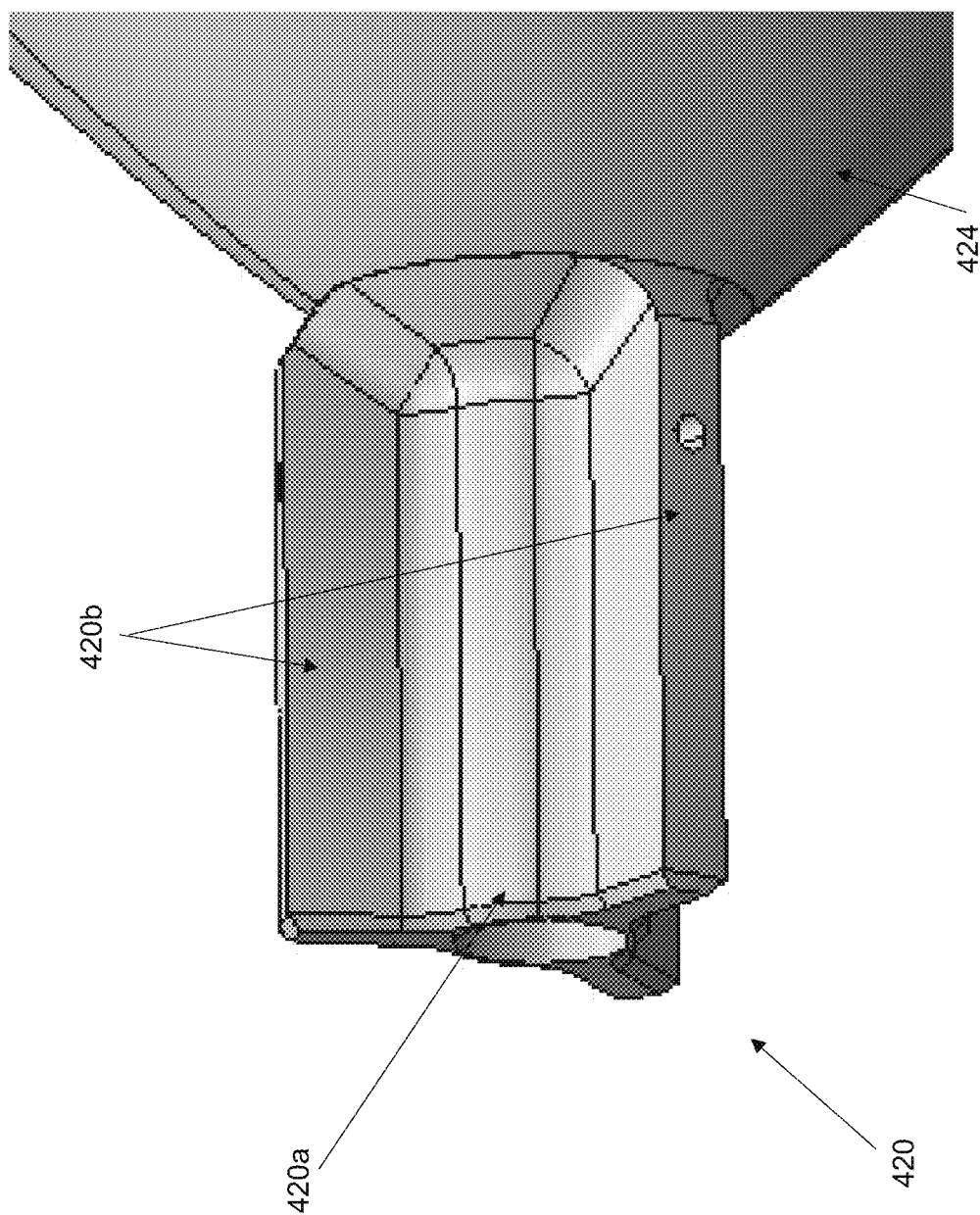
FIG. 11 shows a spider diverter forming part of the centrifugal separator shown in FIG. 7.
Figure 12:
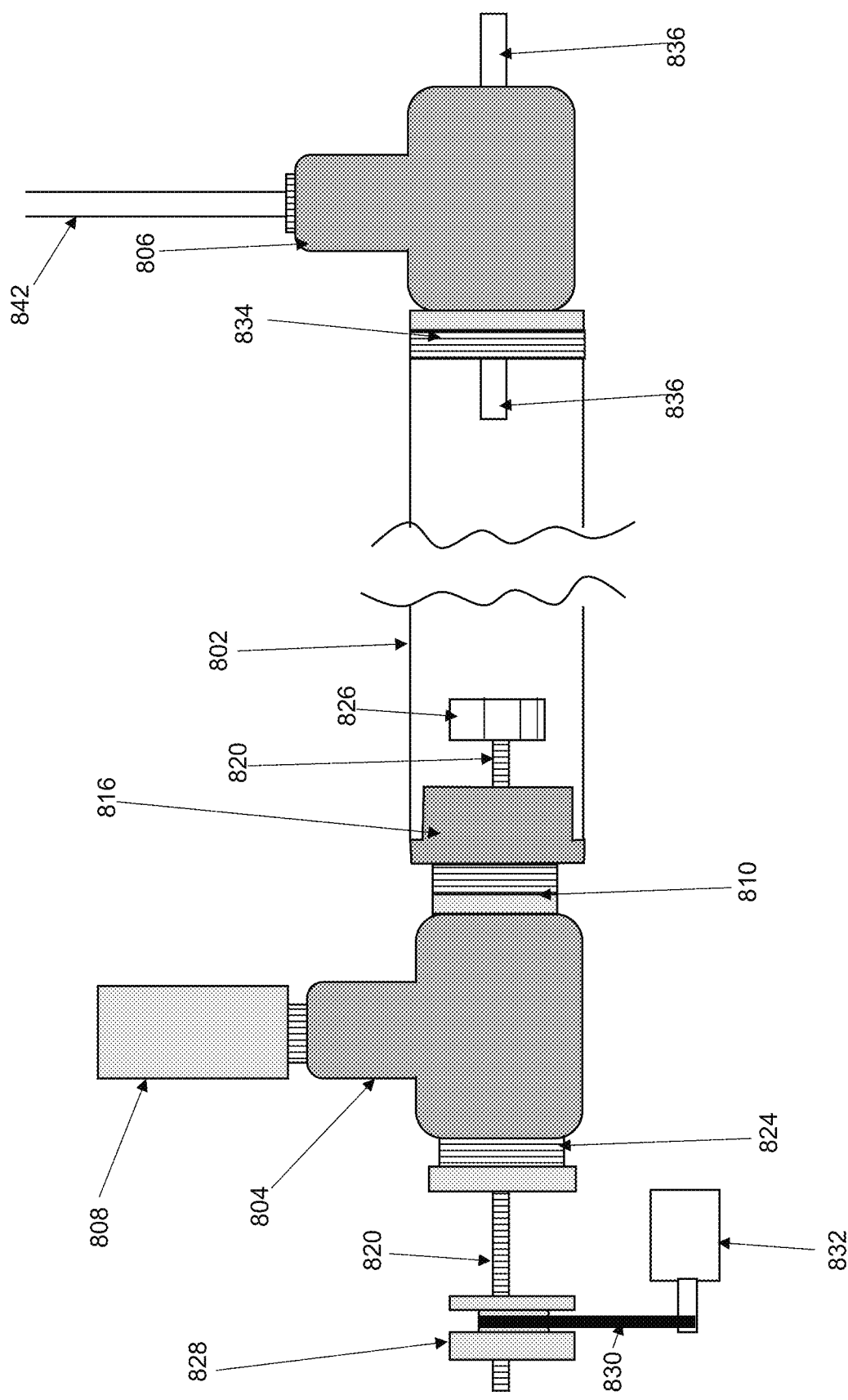
FIG. 12 is a schematic diagram showing a vortex separation device that can form part of the apparatus of the invention.

A centrifugal separator forming part of an apparatus according to a second embodiment of the invention is illustrated in FIGS. 7 to 11. As shown in FIGS. 7 and 8, the centrifugal separator includes a support structure base 402 and three upstanding support pillars 404, 406, 408.

Mounted on the inwardly facing sides of two of the upstanding support pillars 404, 406 are bearing assemblies, which are of conventional construction. A drum 410 formed from stainless steel extends between the two bearing assemblies. The drum has a cylindrical central section 412 and two conical end portions 414. The drum is formed from two parts. The first part comprises one conical end portion and the majority of the cylindrical section with the second part comprises the other conical end portion and a cylindrical axially extending wall, which forms part of the central cylindrical section when assembled. Each of the two parts comprise a flange at the end of their cylindrical sections and are sealed together by means of one or more sealing clamps 416. At the apexes of each of the two conical end portions is a hollow shaft 418 which engages with the bearing assemblies in the upstanding support pillars 404, 406, 408. The two shaft ends extend into the bearings and are rotatable therein. One end of the hollow shaft is connected to a fluid supply pipe. The outer surfaces of the fluid supply pipe are sealed against the inner surfaces of the hollow shaft.

One of the conical end sections of the drum is provided with a hole through which a fluid to be separated enters the drum (the drum inlet). The other conical end section of the drum is provided with outlets through which a separated or purified fluids exits the drum (the drum outlet).

The drum inlet is connected to a pressurised source of contaminated water to be purified. Inside the drum inlet there is a spider diverter 420, shown in FIG. 9. The spider diverter 420 takes the form of a tube 420a with a number (in this case three) radially extending walls 420b. The tube is blocked and serves to prevent fluid from passing through the hollow shaft 418. As the inside of the tube is blocked, fluid entering through the fluid inlet passes between the radially extending walls and are then diverted outwardly by the outer surface of the skin, through the annular channel between the drum wall and the inner wall.

The cylindrical and conical sections of the drum both have a double-skinned arrangement formed by the inner surface 422 of the drum and the outer surface of an inner wall 424. There is therefore an annular channel 426 between the outer surface of the inner wall and the inner surface of the drum wall. The double-skinned arrangement means that the fluid is subjected to maximum centrifugal forces towards the radially outer region of the drum. The drum and inner wall are shaped so that the cross-sectional area along the length of the drum is constant. Therefore, the distance between the inner surface of the drum and the inner wall decreases along the conical section of the drum, as the diameter of the cross-section increases. This means that the fluid can travel through the drum with no change in velocity.

The inner surface of the drum and the outer surface of the skin are both formed from stainless steel and are polished to reduce turbulence being imparted on the separating fluid.

On entering the system, the stream of contaminated water is moved via the spider diverter 420 and the conical inner wall 424 towards the outer diameter of the main separation drum. The angles of the conical sections encourage flow of liquid in a low turbulence manner to the radially outer parts of the drum where centrifugal forces are highest. A pump moves the liquid stream through the separation drum and the centrifugal force causes heavier particles to migrate towards the outer wall 422, leaving lighter particles towards the inner wall.

At the outlet end of the drum there is a diverter cone 430. The diverter cone divides the liquid stream into two. The less dense component of the stream passes one side (the radially inner side) of the diverter and through the drum outlet. The denser component of the liquid passes the other side (the radially outer side) of the diverter and through a separate outlet positioned perpendicular to the drum outlet.

The diverter cone 430 can be actuated back and forth on the rotational axis of the system to change the division point in the cross section of the flow.

The diverter cone 430 is formed from a blade of stainless steel and is connected to a tubular shaft. The stainless steel blade is polished to minimise turbulence and promote laminar flow of the liquid stream through the apparatus. The tubular shaft partitions the outlet end of the tube into an inner outflow 432 and an outer outflow 434. The denser component of the liquid stream, having passed the diverter cone on its radially outer side, then passes through outer outflow 434. The less dense component, having passed on the radially inner side of the diverter cone, then passes through inner outflow 432. Both outflows may be directed back to the central area where an arrangement of lip seals and O-ring seals channel the outflows to their respective outlet pipes. Alternatively, the outer outflow 434 directs the denser component of the fluid to an outlet pipe which is angled at approximately perpendicularly to the axis of rotation of the drum and the inner outflow 432 directs the less dense component to another outlet pipe, aligned with the hollow shaft 418.

The drum is mounted on roller bearings (not shown) at each end. Rotation of the drum is driven by a drive belt which engages a pulley that is fastened through the drum fabrication and into the spider diverter 420. The drive belt is linked to an electric motor. Alternatively, the drive belt can be linked to a hydraulic powered turbine or a high-pressure air powered turbine.

In use, a contaminated water stream (for example, a mixture of oil and water) is pumped into the input, ideally using a low turbulence type of pump (such as a wobble plate piston pump). The drum is then spun at high rotational speed (circa 3,000 rpm) via the belt drive. The spider diverter 420 maintains mechanical continuity through the central tube 418 of the system while permitting fluid entry into the annular channel 426.

The degree of purity of the (at least partially) purified water streams produced by the embodiments described herein can be determined by measuring the transparency or optical absorbance of the separated fluids. Based on the determined degree of separation and/or purity of the separated fluids, the separation apparatus can be tuned to maximise separation. The measurement of the degree of separation works on the principle of the clearer the fluid the greater the light transmission through a fluid therefore providing a higher reading to a measuring light meter (e.g. a device containing a light dependent resistor which provides a reading based on the amount of light detected). To ensure a consistent light source, LED light sources are used.

Figure 13:
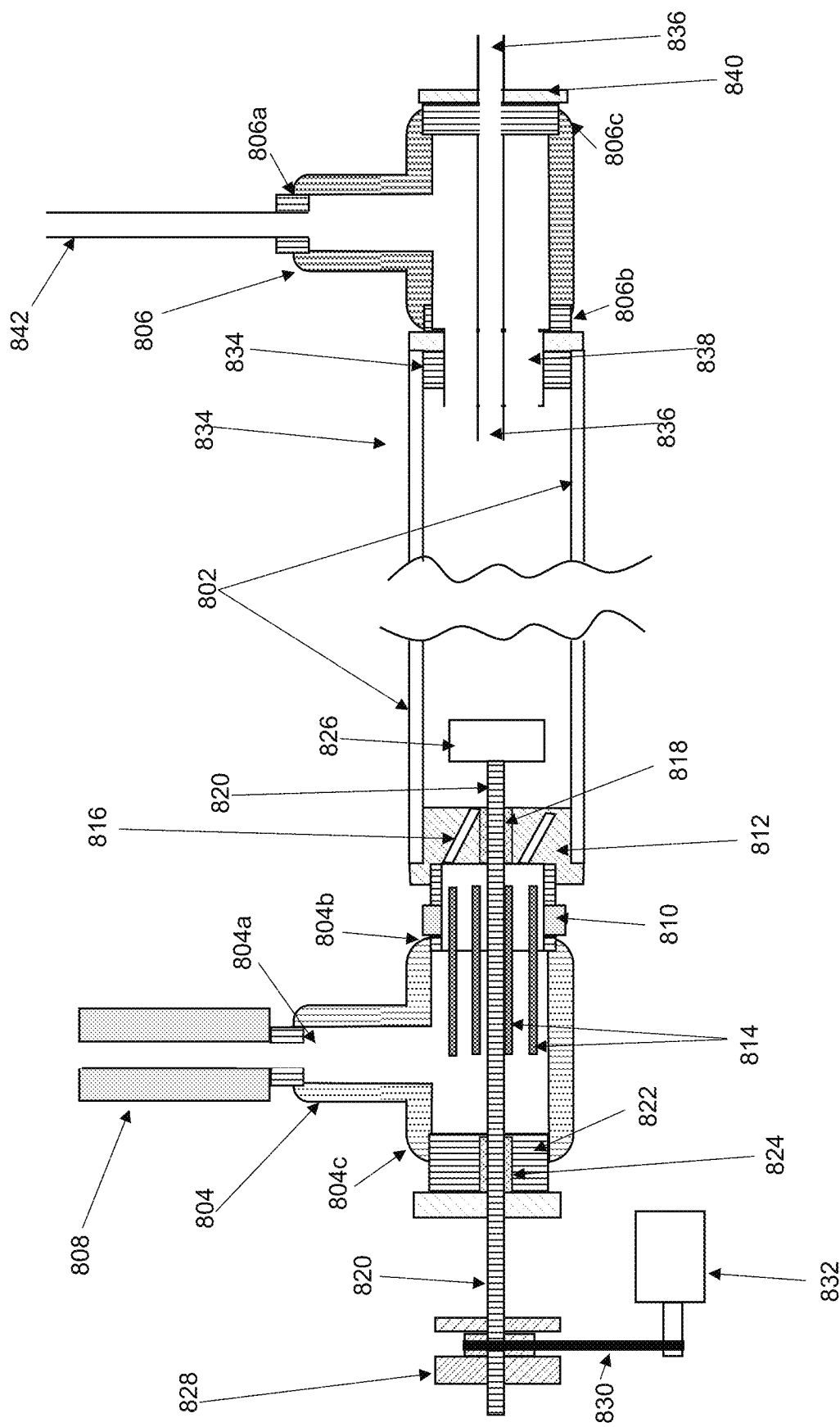
FIG. 13 is a cross-sectional view of the vortex separation device shown in FIG. 12.

FIGS. 13 and 14 show a vortex separation device according to an embodiment of the invention. The vortex separation device may be used either alone or in combination with a further separation device (for example, a centrifugal separation apparatus such as the apparatuses shown in FIGS. 3 to 11).

The vortex separation device comprises a separation tube (802) disposed between an upstream T-connector (804) and a downstream T-connector (806).

Each T-connector (804, 806) has a pair of coaxial longitudinally aligned end openings and a perpendicular (with respect to the longitudinal openings) lateral opening. These openings serve as the connector inlets or outlets. The three openings of the T-connectors (804, 806) are internally threaded to allow connection with other components of the vortex separation device The lateral opening (804*a*) on the upstream T-connector is connected by means of its internal thread to an externally threaded end of a tubular member (808) which in turn is connected to a pressurised fluid source. The lateral opening (804*a*) on the upstream T-connector therefore serves as a fluid inlet.

A first end opening (804*b*) of the upstream T-connector (804) serves as an outlet for the T-connector. The outlet is internally threaded for connection with an externally threaded first double-ended tubular spigot (810). Fluid passes from the outlet of the upstream T-connector through the first double-ended tubular spigot (810) and then onward to a circular vortex-inducing plate (812).

The first double-ended tubular spigot (810) has a central portion and two externally threaded end portions. One of the externally threaded end portions engages with the outlet of the upstream T-connector (804*b*), whilst the other engages with a threaded bore of the circular vortex-inducing plate (812).

Water to be partially purified or further purified enters the vortex separation device via the upstream T-connector (804) and passes through a series of parallel channels. Within the first double-ended tubular spigot there are a number of guide walls (814) which define the parallel channels. The guide walls (814) may be made from a metal or plastics material, which is sufficiently rigid so as not to deform as the water stream passes through the double-ended spigot (810).

Figure 14B:
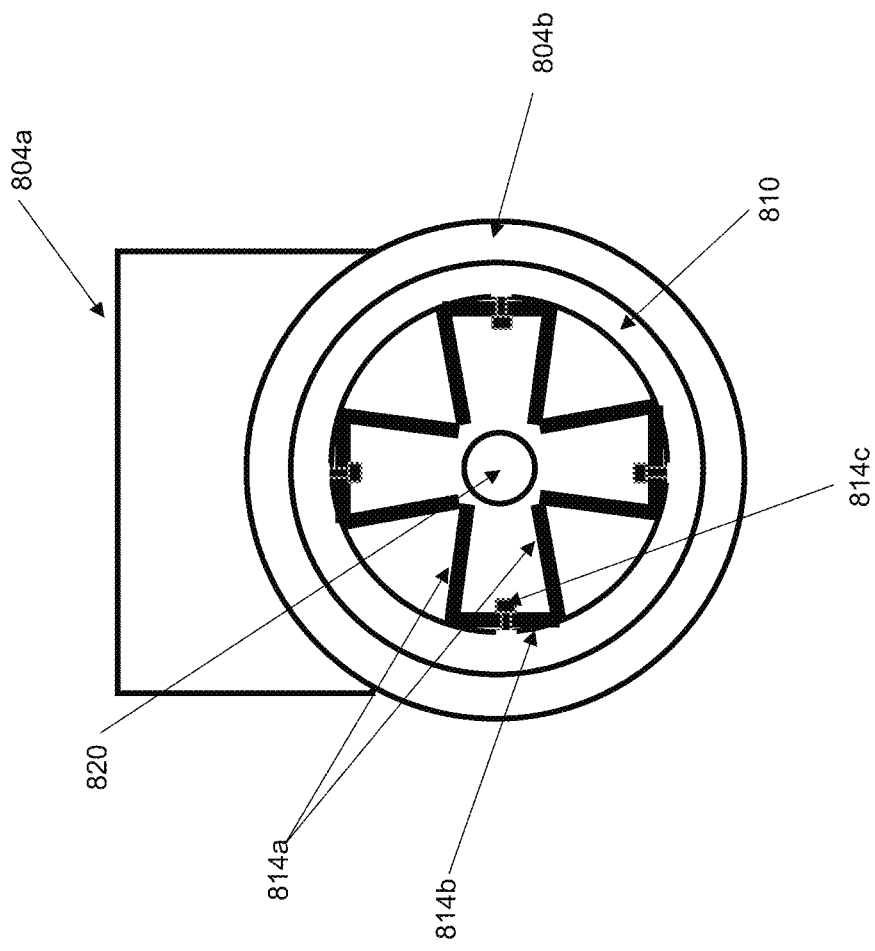
FIGS. 14A and 14B shows the arrangement of the guide walls within the first double-ended spigot in two separate embodiments of the vortex separating device.
Figure 14A:
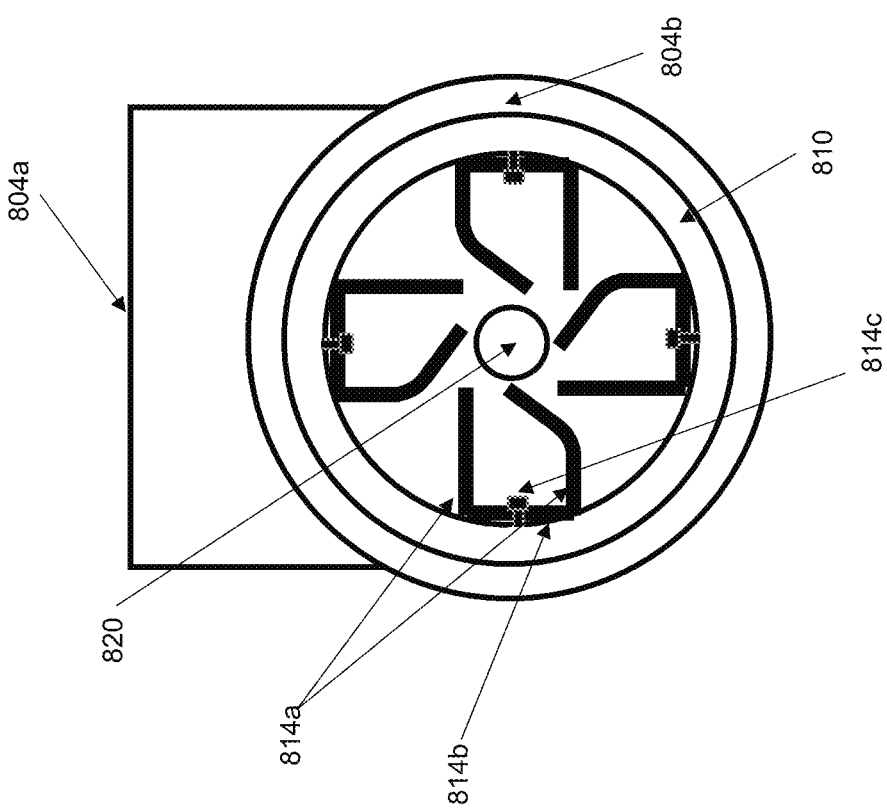

In example of the arrangement of the guide walls (814) within the upstream T-connector (804) is shown in FIG. 14A.

The guide walls (814) have a substantially U-shaped cross-section and have a base portion (814*b*) and two substantially perpendicular arms or side walls (814*a*) at each side of the base portion. One of the arms (814*a*) of each guide wall is bent to provide clearance for the rotating drive shaft (820). The two arms or side walls (814*a*) and the base (814*b*) define a channel with an open side, which faces away from the interior wall of the first double-ended spigot (810). The guide walls are attached (for example, by means of screws/rivets (814*c*)) to the interior wall of first double-ended spigot (810) equidistantly around its inner circumference.

An alternative arrangement of the guide walls (814) is shown in FIG. 14B. In this arrangement, the guide walls (814) have a substantially U-shaped cross-section and have a base portion (814*b*) and two converging arms or side walls (814*a*) at each side of the base portion. The two arms (814*a*) and the base (814*b*) define a channel with an open side, which faces the centre of the first double-ended spigot (810). The guide walls are attached (for example, by means of screws/rivets (814*c*)) to the interior wall of first double-ended spigot (810) equidistantly around its inner circumference.

In FIGS. 14A and 14B, screws/rivets (814*c*) are used to secure the guide walls to the interior of the first double-ended spigot (810). However, it will be appreciated that in practice, the screws/rivets may be countersunk into the first double-ended spigot (810) in order to further reduce the turbulence of the fluid stream passing through the first double-ended spigot (810). Alternatively, the guide walls can be fixed to the interior wall of the double-ended spigot using other fastenings/adhesives.

When a drive shaft (820) is present, the guide walls (814) are arranged to provide a central space through which the drive shaft can pass (as shown in FIGS. 14A and 14B).

The guide walls (814) collimate the fluid before it passes through a vortex-inducing plate or fan.

The vortex inducing plate which causes rotation of the fluid to form a vortex. Due to the centrifugal forces operating on the components of the fluid, as the fluid passes through the separator tube (802), the denser component(s) of the fluid are forced to the outer regions of the separator tube, whilst the less dense components accumulate at or close to the longitudinal axis of the separator tube. The denser component then passes through a radially outer annular collector channel (838) and is directed out of the vortex separator via a lateral opening on the downstream T-collector (806a). The less dense component passes through the radially inner central inner collector tube (836).

Figure 15B:
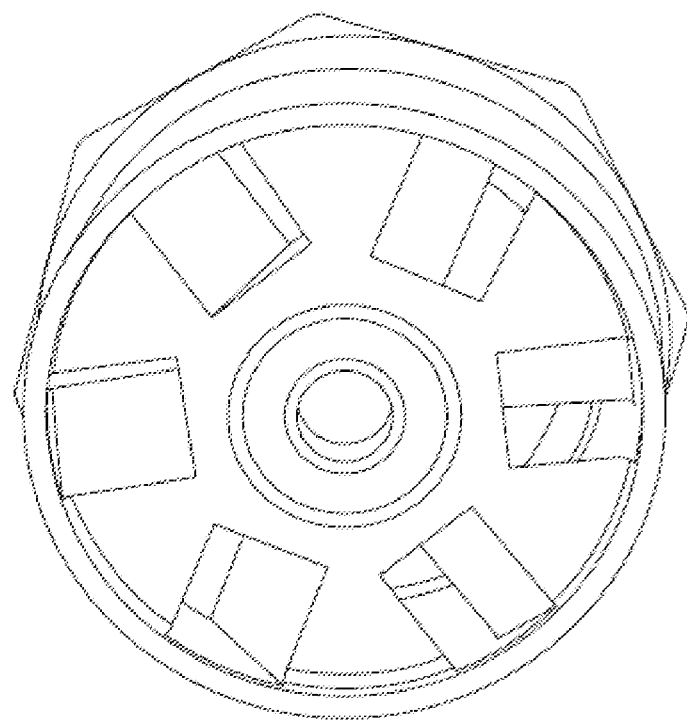
FIGS. 15A and 15B show the two sides of the vortex inducing plate.
Figure 15A:
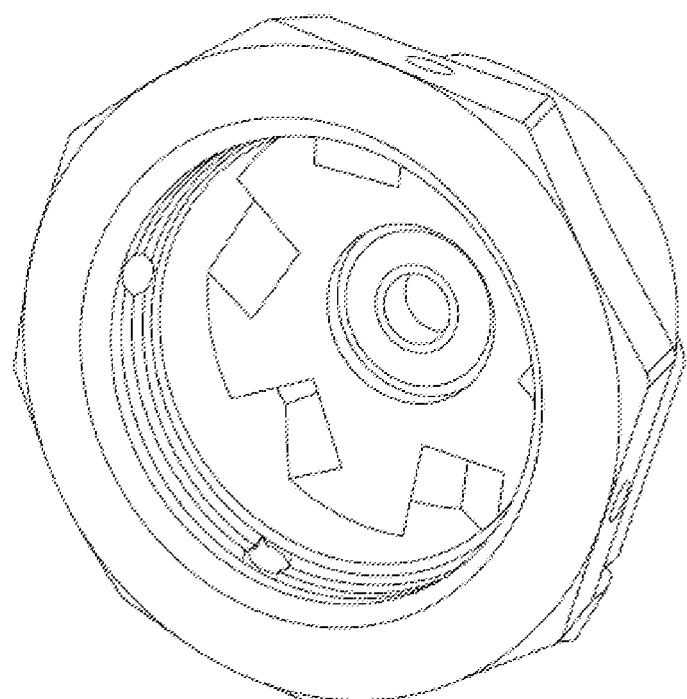

As shown in FIG. 15A, on one side, the vortex-inducing plate (812) has a circular, internally threaded bore for connection with the first double-ended spigot (810). As shown in FIG. 15B, on its other side, the vortex-inducing plate (812) is provided with several (e.g. six) angled conduits (816) spaced equally around the plate and positioned such that fluid passing through the channels is formed into a vortex. The conduits extend through the plate and through the base of the bore.

The vortex-inducing plate (812) also has a central opening, which is fitted with a bearing (818) through which a drive shaft (820) can pass and freely rotate. As the fluid passes through the angled conduits in the vortex-inducing plate (812), the fluid stream is rotated to form a vortex.

The use of the vortex-inducing plate (812) is particularly useful when the fluid stream to be separated comprises a mixture of oil and water.

A second longitudinal opening (804c) of the upstream T-connector (which is positioned opposite the first longitudinal opening) is sealed with a first plug (822). The first plug comprises an externally threaded spigot and a cap having a diameter at least as large as the externally threaded spigot. The first plug also has a central hole, fitted with a bearing (824), through which the threaded drive shaft (820) passes. The drive shaft (820) is able to rotate within the first plug (822).

The drive shaft (820) passes from the outside of the upstream T-connector, through the first plug (822) and upstream T-connector (804) and into the separator tube (802). At the end of the shaft located inside the separator tube (802), an impeller (826) is non-rotatably mounted onto the drive shaft.

The impeller (826) has a central hub with a plurality (e.g. six) blades radiating outwardly from the hub. The hub also has a threaded central hole to allow the impeller (826) to be threaded onto the drive shaft (820).

At an end of the shaft which protrudes from the first plug (822), a pulley wheel (828) is non-rotatably mounted on the shaft. The pulley wheel (828) has a circumferential groove about which a drive belt (830) can be located. The drive belt (830) is connected to an electric motor (832) and the motor can thereby drive rotation of the drive shaft (820) and the impeller (826).

The fluid, which has already passed through the vortex-inducing plate (812), is therefore further rotated by the impeller (826) to increase the rotational velocity of the fluid.

As the fluid travels down the separator tube (802), due to its rotation and the centrifugal forces acting upon it, separation of components of the fluid takes place. The denser component(s) of the fluid stream accumulate at the outer regions of the separator tube (802) whilst the less denser component(s) accumulate at the inner regions of the separator tube (802).

The downstream end of the separator tube (802) is connected to one of the longitudinal openings of the downstream T-connector (806b) by a second double ended-spigot (838). The second double ended spigot (838) is tubular and has a central portion and two end portions. The end portions may be threaded or ribbed to so that a water-tight connection may be made with the tubular pipe (802) and the downstream T-connector (806).

The other longitudinal opening of the downstream T-connector (806c) is sealed with a second plug (840). The second plug (840) comprises an externally threaded spigot and a cap having a diameter at least as large as the externally threaded spigot. The second plug (840) has a central hole through which a central inner collector tube (836) can pass. The inner collector tube (836) extends from the interior of the separation tube (802), through the downstream T-connector (806) and out through the second plug (840). This inner collector tube serves as a first outlet, i.e. an outlet for the denser component of the fluid stream.

Around the inner collector tube (836) there is an annular channel (838) which serves as an outlet for the denser component of the fluid stream. The annular channel (838) is in fluid communication with an outlet pipe (842) in lateral opening (806a) on the downstream T-connector, which serves as a second outlet, i.e. an outlet for the less dense component.

The outlet pipe (842) and inner collector tube (836) may be provided with valves (not shown) which can be opened or closed to control release of the separated fluid components from the vortex separation device.

The vortex separation device described above is particularly useful for further purification of a heavily oil-contaminated water stream that has been partially purified by passage through a centrifugal separator as described above.

In another embodiment, in the vortex separation device described above, the vortex-inducing plate may be replaced with a bladed impeller. This embodiment is particularly useful for separating a liquid stream comprising water and sand. As the difference if density between water and sand is greater than for water and oil, the impeller, drive shaft and motor may not be required for efficient separation and may therefore be omitted from the device. A shaft may still be present and be non-rotatably fixed to the device. The bladed impeller may be non-rotatably mounted on or attached to the shaft.

In yet a further embodiment, in the vortex separation device described above, the vortex-inducing plate is removed and instead the ends of the guide walls are bent at an angle of 45°. The guide walls themselves serve to introduce a vortex to the fluid stream. Again, this embodiment is particularly useful for separating a fluid stream comprising water and sand. As the difference if density between water and sand is greater than for water and oil, the impeller, drive shaft and motor may not be required for efficient separation and may therefore be omitted from the device.

Using the vortex separation device of this embodiment (having the bent guide walls and without the impeller, drive shaft or motor). A mixture of 2.61% by weight of fine white sand (grain size of <200 μm) and water was passed through the vortex separation device described above. The motor was set to drive the impeller at 1600 rpm. The water obtained from output (806) of the vortex separation device contained sand at a level of 6 ppm.

The vortex separation device is used in combination with the centrifugal separation devices described herein (for example, those substantially as shown in FIGS. 3 to 11). As shown above, an apparatus substantially as shown in FIGS. 3 to 6 can be used to provide water having a sand content of 19 ppm to 59 ppm. This water stream can then be passed through a vortex separation device substantially as shown in FIGS. 13 to 14 to further reduce the sand content down to 6 ppm. Similarly, the vortex separation device can be used to further separate an oil and water mix that has been at least partially separated by a centrifugal separation device substantially as shown in FIGS. 3 to 11.

The embodiments described above and illustrated in the accompanying figures and tables are merely illustrative of the invention and are not intended to have any limiting effect. It will readily be apparent that numerous modifications and alterations may be made to the specific embodiments shown without departing from the principles underlying the invention. All such modifications and alterations are intended to be embraced by this application.

The invention claimed is:

1. An apparatus for providing potable water, which apparatus comprises a plurality of components linked in series to provide a flow path through the apparatus, wherein the plurality of components comprises:
   (i) an inlet for a stream of contaminated water requiring purification;
   (ii) a centrifugal separator for separating the contaminated water stream into a partially purified water stream and a contaminant stream;
   (iii) a pre-filter pump;
   (iv) a pre-filter pressure sensor
   (v) a first filter assembly comprising one or more filter modules for removing particles of a predetermined size and/or removing organic contaminants from the partially purified water stream;
   (vi) a post-filter pressure sensor;
   (vii) a post-filter pump;
   (viii) a second filter assembly comprising one or more reverse osmosis filters;
   (ix) a UV steriliser unit; and
   (x) an outlet for purified potable water;
   and wherein the apparatus further comprises an electronic controller for controlling and monitoring the operation of the apparatus; and wherein the components (i) to (x) are arranged, from an upstream (inlet) end of the apparatus to a downstream (outlet) end of the apparatus, in the order (i), (ii), (iii), (iv), (v), (vi), (vii), (viii), (ix), (x).

2. An apparatus for providing potable water, which apparatus comprises a plurality of components linked in series to provide a flow path through the apparatus, wherein the plurality of components comprises:
   (i) an inlet for a stream of contaminated water requiring purification;
   (i-a) one or more devices for monitoring levels of contaminants in the contaminated water stream;
   (ii) a centrifugal separator for separating the contaminated water stream into a partially purified water stream and a contaminant stream;
   (iii) a pre-filter pump;
   (iv) a pre-filter pressure sensor
   (v) a first filter assembly comprising (v-a) one or more filter modules for removing particles of a predetermined size and (v-b) one or more filter modules for removing organic contaminants from the partially purified water stream;
   (vi) a post-filter pressure sensor;
   (vii) a post-filter pump;
   (vii-a) a pressure control valve downstream of the post-filter pump (vii);
   (vii-b) a further pressure sensor downstream of the pressure control valve (vii-a);
   (viii) a second filter assembly comprising a plurality of reverse osmosis filters;
   (ix) a UV steriliser unit;
   (ix-a) one or more devices downstream of the UV steriliser unit for monitoring the purity of water emerging from the UV steriliser unit; and (x) an outlet for purified potable water;
   and wherein the apparatus further comprises an electronic controller for controlling and monitoring the operation of the apparatus and a telecommunications device allowing connection of the electronic controller to a remote controller and monitoring station; and wherein the components (i) to (x) are arranged, from an upstream (inlet) end of the apparatus to a downstream (outlet) end of the apparatus, in the order (i), (i-a), (ii), (iii), (iv), (v), (vi), (vii), (vii-a), (vii-b), (viii), (ix), (ix-a) (x).

3. An apparatus according to claim 1 wherein the centrifugal separator (ii) comprises:
   a support structure;
   a separator unit rotatably mounted on the support structure;
   means for rotating the separator unit on the support structure;
   the separator unit having a longitudinal axis of rotation extending through a longitudinal tube disposed centrally within the separator unit; the longitudinal tube being connected or connectable to the inlet (i); the longitudinal tube having one or more openings for receiving the contaminated water stream under pressure; and one or more lateral openings for introducing the contaminated water stream into the separator unit; wherein the separator unit comprises, in addition to the longitudinal tube:
   a centrifugal separation chamber for separating suspended material from the contaminated water stream;
   a first collector for collecting partially purified water from which suspended contaminant material has been removed; and
   a second collector for collecting waste water containing the removed suspended contaminant material.

4. An apparatus according to claim 1 wherein the centrifugal separator (ii) comprises:
   a support structure and a centrifugal separator unit rotatably mounted on the support structure so as to be rotatable about a rotational axis extending through the centrifugal separator unit;
   a drive element for driving rotation of the centrifugal separator unit;
   wherein the centrifugal separator unit comprises a centrifugal separation chamber connected the inlet (i), a first outlet for collecting a higher density component of the contaminated water stream, and a second outlet for collecting a lower density component of the contaminated stream;

the said first outlet being connected to a first collector for collecting the higher density component and the second outlet being connected to a second collector for collecting the lower density component;

the centrifugal separation chamber comprising a curved or inclined guide surface for guiding flow of the contaminated water stream from the inlet (i) in a radially outward direction;

wherein the centrifugal separator unit is provided with a wall member which is axially movable to provide a selected degree of occlusion of the first outlet and thereby control flow of the higher density component through the first outlet.

5. A method of providing potable water which method comprises passing a stream of contaminated water through an apparatus as defined in claim 1.

6. An apparatus according to claim 2 wherein the centrifugal separator (ii) comprises:
a support structure;
a separator unit rotatably mounted on the support structure;
means for rotating the separator unit on the support structure;
the separator unit having a longitudinal axis of rotation extending through a longitudinal tube disposed centrally within the separator unit; the longitudinal tube being connected or connectable to the inlet (i); the longitudinal tube having one or more openings for receiving the contaminated water stream under pressure; and one or more lateral openings for introducing the contaminated water stream into the separator unit; wherein the separator unit comprises, in addition to the longitudinal tube:
a centrifugal separation chamber for separating suspended material from the contaminated water stream;
a first collector for collecting partially purified water from which suspended contaminant material has been removed; and
a second collector for collecting waste water containing the removed suspended contaminant material.

7. An apparatus according to claim 2 wherein the centrifugal separator (ii) comprises:
a support structure and a centrifugal separator unit rotatably mounted on the support structure so as to be rotatable about a rotational axis extending through the centrifugal separator unit;
a drive element for driving rotation of the centrifugal separator unit;

wherein the centrifugal separator unit comprises a centrifugal separation chamber connected the inlet (i), a first outlet for collecting a higher density component of the contaminated water stream, and a second outlet for collecting a lower density component of the contaminated stream;

the said first outlet being connected to a first collector for collecting the higher density component and the second outlet being connected to a second collector for collecting the lower density component;

the centrifugal separation chamber comprising a curved or inclined guide surface for guiding flow of the contaminated water stream from the inlet (i) in a radially outward direction;

wherein the centrifugal separator unit is provided with a wall member which is axially movable to provide a selected degree of occlusion of the first outlet and thereby control flow of the higher density component through the first outlet.

8. A method of providing potable water which method comprises passing a stream of contaminated water through an apparatus as defined in claim 2.

9. An apparatus according to claim 2 wherein the one or more filter modules (v-b) for removing organic contaminants from the partially purified water stream are carbon filter modules.

10. An apparatus according to claim 2 wherein the second filter assembly comprises two reverse osmosis filters arranged in parallel.

11. An apparatus according to claim 2 further comprising a water flow sensor or flow meter.

12. An apparatus according to claim 4 wherein the centrifugal separator further comprises a longitudinal tube which passes through the centrifugal separator unit.

13. An apparatus according to claim 3 wherein the one or more lateral openings are elongate and angled.

14. An apparatus according to claim 4 wherein the guide surface is conical or frusto-conical.

15. An apparatus according to claim 4 wherein the wall member serves to increase or reduce the size of the first outlet.

16. An apparatus according to claim 6 wherein the one or more lateral openings are elongate and angled.

17. An apparatus according to claim 7 wherein the guide surface is conical or frusto-conical.

18. An apparatus according to claim 7 wherein the wall member serves to increase or reduce the size of the first outlet.

* * * * *